US009382003B2

(12) United States Patent
Burema et al.

(10) Patent No.: US 9,382,003 B2
(45) Date of Patent: Jul. 5, 2016

(54) AERIAL FARM ROBOT SYSTEM FOR CROP DUSTING, PLANTING, FERTILIZING AND OTHER FIELD JOBS

(71) Applicant: Bee Robotics Corporation, Millbrae, CA (US)

(72) Inventors: Harm Burema, Salvador Bahia (BR); Anatoly Filin, Moscow (RU)

(73) Assignee: Bee Robotics Corporation, Millbrae, CA (US)

( * ) Notice: Subject to any disclaimer, the term of this patent is extended or adjusted under 35 U.S.C. 154(b) by 0 days.

(21) Appl. No.: 14/220,990

(22) Filed: Mar. 20, 2014

(65) Prior Publication Data

US 2014/0303814 A1 Oct. 9, 2014

Related U.S. Application Data

(60) Provisional application No. 61/804,685, filed on Mar. 24, 2013.

(51) Int. Cl.
*B64C 39/02* (2006.01)
*B64D 1/16* (2006.01)
(Continued)

(52) U.S. Cl.
CPC ............... *B64D 1/16* (2013.01); *A01B 79/005* (2013.01); *A01B 79/02* (2013.01); *A01C 21/00* (2013.01); *B64C 39/024* (2013.01); *Y10S 901/01* (2013.01)

(58) Field of Classification Search
CPC ............. B64C 19/00; B64C 2201/042; B64C 2201/141; B64C 27/08; B64C 27/12; B64C 2201/027; B64C 2201/00; B64D 1/18; B64D 1/00; B64D 1/16

USPC ............ 701/3, 2; 244/190, 136, 17.23, 17.13, 244/189, 76 R, 100 R, 58; 239/416.1, 550, 239/428; 416/442; 169/53
See application file for complete search history.

(56) References Cited

U.S. PATENT DOCUMENTS

| 1,749,471 A | 3/1930 | De Bothezat |
| 2,479,549 A | 8/1949 | Ayres et al. |

(Continued)

FOREIGN PATENT DOCUMENTS

| WO | 95/15499 A1 | 6/1995 |
| WO | 2011/161471 A2 | 12/2011 |

(Continued)

OTHER PUBLICATIONS

Dorhout R&D LLC, "Prospero: Robot Farmer, Why small, autonomous robots?," date unknown, http://dorhoutrd.com/prospero_robot_farmer, 7 pages, downloaded May 23, 2014.

(Continued)

*Primary Examiner* — Marthe Marc-Coleman
(74) *Attorney, Agent, or Firm* — Patent Strategies; Edward Durney

(57) ABSTRACT

Modern farming is currently being done by powerful ground equipment or aircraft that weigh several tons and treat uniformly tens of hectares per hour. Automated farming can use small, agile, lightweight, energy-efficient automated robotic equipment that flies to do the same job, even able to farm on a plant-by-plant basis, allowing for new ways of farming. Automated farming uses unmanned aerial vehicles (UAVs) that are equipped with detachable implements and reservoirs and that we call "aerial farm robots." Automated farming uses high-precision GPS and other precision positioning and vision technology to autonomously and precisely perform crop dusting, planting, fertilizing and other field related farming or husbandry tasks. The subsystems for the control, refill, recharge and communication subsystems of the aerial farm robots are part of the overall automated farming system, and can autonomously handle most of the husbandry tasks on a farm.

3 Claims, 30 Drawing Sheets

ARTIST REPRESENTATION OF SYSTEM OVERVIEW
FUNCTIONING IN A FIELD

(51) Int. Cl.
*A01B 79/00* (2006.01)
*A01B 79/02* (2006.01)
*A01C 21/00* (2006.01)

(56) References Cited

U.S. PATENT DOCUMENTS

| | | | |
|---|---|---|---|
| 2,571,566 A | | 10/1951 | Green |
| 2,583,884 A | | 1/1952 | Ripper et al. |
| 2,651,480 A | | 9/1953 | Pullin |
| 2,987,272 A | | 6/1961 | Vogt |
| 3,463,398 A | | 8/1969 | Smith et al. |
| 3,688,952 A | | 9/1972 | Barlow |
| 5,170,849 A | | 12/1992 | Nikkel et al. |
| 6,199,000 B1 | | 3/2001 | Keller |
| 6,671,582 B1 * | | 12/2003 | Hanley ............ 700/245 |
| 6,711,501 B2 | | 3/2004 | McClure |
| 7,398,946 B1 * | | 7/2008 | Marshall ............ 244/58 |
| 7,765,780 B2 | | 8/2010 | Koselka |
| 7,854,108 B2 | | 12/2010 | Koselka |
| 8,381,501 B2 | | 2/2013 | Koselka |
| 8,437,879 B2 | | 5/2013 | Anderson |
| 8,511,606 B1 * | | 8/2013 | Lutke et al. ............ 244/58 |
| 2004/0068415 A1 * | | 4/2004 | Solomon ............ 705/1 |
| 2005/0231156 A1 * | | 10/2005 | Yan ............ 320/107 |
| 2006/0213167 A1 * | | 9/2006 | Koselka et al. ............ 56/10.2 A |
| 2006/0238159 A1 * | | 10/2006 | Jung ............ 318/587 |
| 2009/0118875 A1 * | | 5/2009 | Stroud ............ 701/3 |
| 2010/0070072 A1 | | 3/2010 | Goldman |
| 2010/0217438 A1 * | | 8/2010 | Kawaguchi et al. ............ 700/248 |
| 2011/0017865 A1 | | 1/2011 | Achtelik et al. |
| 2012/0152877 A1 * | | 6/2012 | Tadayon ............ 212/224 |
| 2012/0175468 A1 * | | 7/2012 | Zerof ............ 244/190 |
| 2012/0265391 A1 * | | 10/2012 | Letsky ............ 701/25 |
| 2013/0068892 A1 * | | 3/2013 | Bin Desa et al. ............ 244/190 |
| 2013/0081245 A1 * | | 4/2013 | Vavrina et al. ............ 29/402.08 |
| 2013/0093625 A1 * | | 4/2013 | Smith ............ 342/387 |
| 2014/0129059 A1 * | | 5/2014 | Scarlatti et al. ............ 701/16 |
| 2014/0163781 A1 * | | 6/2014 | Vian et al. ............ 701/3 |
| 2014/0246545 A1 * | | 9/2014 | Markov ............ 244/190 |
| 2014/0249693 A1 * | | 9/2014 | Stark et al. ............ 701/2 |

FOREIGN PATENT DOCUMENTS

| | | |
|---|---|---|
| WO | 2011/161471 A3 | 12/2012 |
| WO | 2013/069059 A1 | 5/2013 |

OTHER PUBLICATIONS

"Agricultural robots: Fields of automation," The Economist, Dec. 10, 2009, 5 pages.
Autocopter Corporation, "Precision Agriculture," date unknown, http://www.autocopternet/precision_ag.php, 2 pages, downloaded May 23, 2014.
"Is that a robot in your suitcase?," ScienceDaily, Nov. 9, 2011, 2 pages.
Volt Aerial Robotics, "Mini VTOL UAV," date unknown, 2 pages.
Spencer Ackerman, "Drone Boosters Say Farmers, Not Cops, Are the Biggest U.S. Robot Market," Wired, Feb. 5, 2013, 3 pages.
Barnard Microsystems, Yamaha RMAX Type II G unmanned helicopter, date unknown, http://www.barnardmicrosystems.com/UAV/uav_list/yamaha_rmax.html, 4 pages.
Quadcopter, Wikipedia, date unknown, http://en.wikipedia.org/wiki/Quadcopter, 10 pages, downloaded Dec. 9, 2014.
Mike Hanlon, "Yamaha's RMAX—the worlds most advanced non-military UAV," Gizmag, http://www.gizmag.com/go/2440/, Nov. 19, 2004, 6 pages, downloaded Dec. 9, 2014.
Yamaha, "Yamaha RMAX Type II G/Type II," http://rmax.yamaha-motor.com.au/, date unknown, 1 page, downloaded Dec. 9, 2014.
Lorenz Meier et al., "PIXHAWK: A Micro Aerial Vehicle Design for Autonomous Flight using Onboard Computer Vision," date unknown, http://www-oldurls.inf.ethz.ch/personal/pomarc/pubs/MeierAURO12.pdf, 31 pages, downloaded Dec. 9, 2014.
Lorenz Meier et al., "PIXHAWK: A System for Autonomous Flight using Onboard Computer Vision," date unknown, http://www.inf.ethz.ch/personal/lomeier/publications/pixhawk_icra2011.pdf, 6 pages, downloaded Dec. 9, 2014.
Russian Patent Office, International Search Report, Jul. 16, 2014, 9 pages.

* cited by examiner

ARTIST REPRESENTATION OF SYSTEM OVERVIEW FUNCTIONING IN A FIELD

SYSTEM OVERVIEW

DIAGRAM SHOWING AREA-RELATED TERMS

STRUCTURE OF AERIAL FARM ROBOT

POSITIONING OF SPRAY HEADS ON AERIAL FARM ROBOT

EXAMPLE OF A RESERVOIR AND SPRAY HEAD

EXAMPLE OF PLANTING TOOLSET

EXAMPLE OF DRILL FERTILIZING TOOLSET

EXAMPLE OF A TOOLSET FOR BROADCAST FERTILIZING

ONBOARD ELECTRONICS FOR AERIAL FARM ROBOT

HOW RTK CORRECTIONS ARE MADE

REDUCING ERROR BY TUNING

USING STABILIZATION ZONES TO INCREASE PRECISION

SAMPLE OF MISSION PLAN EXECUTION LOGIC

COMPONENTS OF BASE STATION

POSSIBLE CONFIGURATIONS OF BASE STATION AND COMMUNICATION CENTER

COMPONENTS OF CONTROL CENTER

PRE-DEFINED CORRIDORS FOR FLIGHT

CORRIDORS FOR COLLISION AVOIDANCE

REFILLING RESERVOIR FOR CROP DUSTING

REFILLING RESERVOIR FOR PLANTING OR FERTILIZING

AUTOMATIC CAROUSEL BATTERY CHARGER/RECHARGER

BATTERY POSITION IN CAROUSEL

POWER SUPPLY FOR RECHARGING BATTERIES

COMMUNICATION NETWORK

COMPONENTS OF FARM CONTROL SYSTEM BACKEND

FIGURE 27
SAMPLE SERVICE ORDER FILLED IN BY OPERATOR

FIGURE 28
LIST OF SERVICE ORDERS

FIGURE 29
INFORMATION ON EACH AERIAL FARM ROBOT IN THE FLEET

SERVICE ORDER AREAS DISPLAYED ON MAP

MAP OF SERVICE ORDER FOR A PARTICULAR FIELD OR BLOCK

OVERVIEW OF FARM OPERATION STATISTICS

SCREEN FOR TESTING, TECH SUPPORT, AND TROUBLESHOOTING OF A
MISSION PROGRAM

TRANSLATION OF SERVICE ORDER TO WAYPOINT PROGRAM

GENERATING SERVICE RUNS AND LOADING TO ROBOTS

COMPARISON OF DIFFERENCE IN SERVICE ORDER RUN GAMMA

BLOCK DIAGRAM SHOWING PRECISE POSITIONING ALTERNATIVE - ONBOARD

BLOCK DIAGRAM SHOWING PRECISE POSITIONING ALTERNATIVE - EXTERNAL

9,382,003 B2

AERIAL FARM ROBOT SYSTEM FOR CROP DUSTING, PLANTING, FERTILIZING AND OTHER FIELD JOBS

CLAIM OF PRIORITY

This application claims the benefit of U.S. Provisional Application No. 61/804,685 entitled Aerial Farm Robot System for Crop Dusting, Planting, Fertilizing and Other Field Jobs, filed Mar. 24, 2013, which is hereby incorporated by reference in its entirety.

A. INTRODUCTION

The world population is growing, and especially as more people adapt Western diet standards, will continue to consume ever growing amounts of foods. Modern farming has made tremendous strides forward in its ability to feed this ever increasing world population. Advances in genetics, chemical engineering, fertilization, soil correction and equipment engineering have revolutionized crop production systems.

Modern farming in every aspect today is completely technology driven. As a result, even with monumental scaling in demand the cost of food has drastically declined, even though today fewer people are employed in food production then any time in history. However, there is a clear world-wide demand—a want and a need—for an ever cheaper, ever larger food supply. Some people even call for a second green revolution to meet the demand.

Planting, tending and harvesting a crop requires both a lot of power and a range of tools, equipment and machinery. These tasks also require trained and skilled operators of this equipment (although they are not always available). Mechanization of farming has allowed an increase to the area that can be planted and increases in yields, mainly due to the precision and the speed with which the crop husbandry tasks can be accomplished. As a result, most farmers in developing countries experience a greater annual expenditure on farm power inputs than on fertilizer, seeds or agrochemicals.

Crop production systems have evolved rapidly over the past century and have resulted in significantly increased yields. But that has come at a cost. Many times the crop production systems have created undesirable environmental side-effects. Soil degradation and erosion, excessive use of farm power inputs, pollution from chemical and organic fertilizers and other agrochemicals, and a loss of bio-diversity are just a few of the examples that have been highlighted over recent years. Furthermore, not only were some crop production systems found to be unsustainable in an environmental sense, in some locations they were also unsustainable in an economic sense, especially when you take into account the complete reliance on the use of carbon fuels whose price can spike.

With this background of farm mechanization and its various social, economic and environmental impacts, we present automated farming as a sustainable and economic alternative to current farming systems.

Automated farming is an alternative to current farm mechanization that will allow us to implement a farming model that drastically optimizes productivity in a sustainable and economic manner. It also allows existing large scale monoculture operations to move to more ecological and economical viable models while significantly increasing yields per hectare.

There is a clear need to plant, treat and harvest plants on an individual basis. Recent developments in computer processing, database and positioning technology have made this possible, but the current large-scale, brute-force, heavy farm machinery prevents us from doing so. Automated farming, as described in this specification, steps away from this approach as it uses small, agile, light weight, energy efficient automated robotic equipment that flies to do the same job on a plant by plant basis that is currently being done by powerful ground equipment that weighs several tons and treats uniformly tens of hectares per hour.

Automated farming uses unmanned aerial vehicles (UAVs) that are equipped with detachable implements and reservoirs and that we call "aerial farm robots." Automated farming uses high-precision GPS to autonomously perform crop dusting, planting, fertilizing and other field related farming or husbandry tasks. The subsystems for the control, refill, recharge and communication subsystems of the aerial farm robots are part of the overall automated farming system, and can autonomously handle most of the husbandry tasks on a farm. This system can, and we think will, replace traditional land- and air-based farming equipment.

Automated farming may also be used to support other functions such as harvesting, monitoring and tilling, but in this example we only explicitly specify the crop dusting, planting and fertilizing functionality. We believe that considerable parts of the example we describe can be reused for the other functions which also fall within the scope of our patent claims.

Advantages of automated farming include:

Energy costs: Using lighter and more appropriate equipment for the job that relies on efficient brushless electric DC motors, we obtain significant energy costs savings compared with the heavy farm equipment in current use.

Eliminating Carbon Fuel Dependency: Modern farming depends totally on carbon fuels, raising many questions as to the sustainability of using carbon fuels for the world food supply. The lower energy use of automated farming and its use of electric energy allows food production using a sustainable form of energy, one that can be generated from on- or off-farm renewable energy sources.

Better Precision: Plants spaced exactly as required will provide growing efficiencies that have not been possible before.

Reduction in Use of Crop Protection Chemicals: Automated farming allows for spot- and band-based application of crop protection chemicals.

Reduction of Fertilizer Use: Fertilizer use can be reduced by placing fertilizer in the exact spot where the plant needs it. This avoids waste and fertilizer runoff and pollution of the water table.

No Soil Compaction: As no equipment will drive on the field, soil compaction caused by heavy equipment is eliminated. This will have a significant positive impact on soil health and increase yields as a result.

No Tracks: Typically 3 to 5% of a crop is lost by tracks made due to sprayers and other heavy equipment entering into the fields being farmed.

Reduced Capital Outlay: We estimate that, due to the lightweight components used in the system, capital acquisition costs will be less than 50% of the current cost of heavy farm machinery for each hectare under management. We think this can be further reduced with large scale production.

Safety: After mining and construction, agriculture has one of the highest accident rates of any industry. Toxic exposure of workers to crop protection chemicals is also unacceptably high. The World Health Organization and the United Nations Environment Program estimate that each year 3 million workers in agriculture in the developing world experience severe poisoning from pesticides, about 18,000 of whom die. According to one study, as many as 25 million workers in developing countries may suffer mild pesticide poisoning yearly. Automated farming largely eliminates this problem.

Eliminating Monoculture/Better Land Use Through Intercropping: The aerial farm robot system can be enhanced to such an extent that crops can be planted, treated and harvested in small plots or even on an individual plant-by-plant basis. The result is an intercropping system that can be managed by aerial farm robots autonomously. The advantages of this are lower disease pressure, better plant health, risk reduction and higher yields per hectare.

Reducing Soil Erosion: Using direct plant no-till systems with inexpensive cover crops and constant localized soil monitoring with automated farming will allow reduction of soil erosion.

Preservation of Biodiversity: The combination of the many advantages above will result in significant yield increases from the same cropland, all in a sustainable manner. That will permit more land to be used for other purposes, like providing places for wild plants and animals to live.

World demand for farm equipment is forecast to top $112 billion in 2012. This is forecast to grow to U$175 billion in 2016, with Asia Pacific accounting for 49%, North America for 17%, Western Europe for 16%, and other regions for 18%. Further projections suggest continuous growth in the production of farm equipment the world over, at a compound annual growth rate of about 4.7% for the period spanning 2012 to 2015. Given this, we believe there is a significant market for the invention defined in our claims, examples of which are given in this specification.

B. TERMINOLOGY

Aerial Application—Commonly called crop dusting, aerial application involves spraying crops with fertilizers, pesticides, and fungicides from an agricultural aircraft. The specific spreading of fertilizer is also known as aerial topdressing.

Aerial Farm Robot—Unmanned multi- or single-rotor aerial vehicle with a tool slot to hold a reservoir and/or a toolset to perform specific farming related tasks.

Aerial Farm Robot System—Complete set of hardware equipment and software components necessary for operating aerial farm robots and executing service orders. The system includes one or more base stations, aerial farm robots with various toolsets, computers, radios, networking and navigation equipment, and software components used on aerial farm robots and on land-based equipment.

Autonomous—An autonomous system is one that can operate on its own to do certain tasks without constant human guidance. More specifically, an autonomous system can, to some degree: (a) gain by itself information about its environment, (b) work for some time without human intervention, (c) move itself or part of itself about its environment without human assistance, and (d) avoid harming people, property, or itself unless designed to do so.

Base Station—General term for the place and equipment where the refill, recharge and storage of aerial farm robots occurs.

Control System—Computer software system specifically developed to control operation of a base station and a fleet of aerial farm robots. The control system is the part of the aerial farm robot system.

Crop Dusting—Colloquialism for the aerial application of pesticides on a growing crop. Most pesticides so applied are no longer a "dust" as such, due to the possibility of drift into non-target areas, but liquid formulations of usually fungicides or insecticides. Traditionally, they can be applied by small, powerful airplanes or by helicopter.

Filler—Chemicals, fertilizer, seeds or whatever else loaded into an aerial farm robot's reservoir.

Pesticide Application—Refers to the practical way in which pesticides (including herbicides, fungicides, insecticides, and nematode control agents) are delivered to their biological targets (such as pest organisms, crops or other plants).

Service Order—Complete description of farming task to be performed on a specific field or sub-field. It should include date, time and desirable duration of operation, location of field or sub-field, type of the operation and specific parameters, such as type of pesticide and its volume application rate. It may also include acceptable weather conditions.

Spray Applications—One common way to apply pesticides, especially in conventional farming, is to use mechanical sprayers. Hydraulic sprayers consist of a reservoir, a pump, a lance (for single nozzles) or boom, and a nozzle (or multiple nozzles). Sprayers convert a pesticide formulation—often containing a mixture of water (or another liquid chemical carrier, such as fertilizer) and chemical—into droplets, which can be large rain-type drops or tiny almost-invisible particles. This conversion is accomplished by forcing the spray mixture through a spray nozzle under pressure. The size of droplets can be altered through the use of different nozzle sizes, or by altering the pressure under which it is forced, or a combination of both. Large droplets have the advantage of being less susceptible to spray drift, but require more water per unit of land covered. Due to static electricity, small droplets can maximize contact with a target organism, but very still wind conditions are required.

Toolset—Specific exchangeable electro-mechanical tools used for farming tasks. The toolset can combine a pump and sprayer, pump and duster, planter (seeder), fertilizer and other instruments.

Ultra-Low Volume Spraying—Ultra-low volume application of pesticides has been defined as spraying at a volume application rate of less than 5 liters per hectare for field crops or less than 50 liters per hectare for tree or bush crops. Volume application rates of 0.25 to 2 liters per hectare are typical for aerial ultra-low volume application to forest or migratory pests.

Area-Related Terms (See FIG. 3)

Active Run—The part of a service run when the toolset (sprayer, planter, or fertilizer) is active.

Block—Part of a field which is uniformly maintained (such as an area where the same crop is planted at the same time). One field can consist of several blocks with the same or different crops.

Field—Continuous piece of land separated from other fields by roads, brooks or other material separators.

Row or Band Centerline—A straight line with no thickness going down the middle of a band. Note that this is not necessarily related to a crop row or planting row.

Service Band—Straight band with thickness which corresponds to the width of coverage of an aerial farm robot's operation.

Service Band Segment—The part of an active run which belongs to one service band.

Service Run—A loaded aerial farm robot round-trip flight between a base station and a field. The path of an aerial farm robot is to travel from the base station to a field, complete its service mission, and return back to the base station. A service run can consist of passive runs and active runs.

Passive Run—The part of a service run when the toolset is switched off. Passive runs are when aerial farm robots are flying to a block and back, and from band to band within one block.

C. OVERVIEW

In this specification, we give examples of automated farming using aerial farm robots. We give just examples, and the examples given should not be considered to define the scope of our invention. The scope of our invention is instead defined in the claims. In this example, shown in FIGS. 1 and 2, an automated farming system includes the following:

1. Aerial Farm Robot

An aerial farm robot is a semi-autonomous multi- or single-rotor unmanned aerial vehicle (UAV) that can fly and execute at least some tasks autonomously using its built-in central processing unit (CPU) in conjunction with a series of sensors such as a gyroscope, accelerometer, magnetometer (compass), barometer, sonar, optical flow, energy consumption and voltage meter, and GPS module. These sensors provide motor inputs, height, pitch, roll, heading, position, attitude, high-precision absolute and relative location, obstacle detection, distance detection, and speed control. Instructions for the tasks to be executed are sent via a wireless communication network to one or more aerial farm robots from a control system that provides an interactive interface to an operator that can input the tasks to be executed using a simple interface.

An aerial farm robot (like in FIG. 4) can be equipped with various interchangeable toolsets depending on the job to be completed, such as those shown in Table 1 below:

TABLE 1

| Task/Toolset | Description |
| --- | --- |
| 1. Spraying | The spraying toolset consists of a reservoir that holds liquid chemicals, pump and lance connected to one or several nozzles. |
| 2. Planting | The planting toolset consists of a reservoir that holds seed, a seed distributor together with a seed drill that will drill a small hole the size of a seed in the soil to a certain depth, deposit a seed and cover the hole. |
| 3. Localized Variable Depth Fertilizing | The localized variable depth fertilizing toolset consists of a reservoir that holds fertilizer, a fertilizer distributor together with a drill that will drill a small hole in the soil to a certain depth, deposit the fertilizer and cover the hole. |
| 4. Broadcast Fertilizing/ Top Dressing | Surface spreading of fertilizers, correctives or granular pesticides. Consists of a reservoir together with a distribution mechanism that allows for the product to be presented at an equal rate to a distribution plate, and that covers a certain distribution width (band). |

In this example, the aerial farm robot has a configurable control board with various inputs and outputs that are connected via a detachable connector to an interchangeable toolset. Each of the toolsets consists of a reservoir relevant to the type of tasks to be completed and a pump or other device to distribute farm inputs or perform some other task. At a basic level, control signals are sent by the toolset control board to the toolset to start and end particular tasks that can be performed by that particular toolset, and such functions as product flow and motor/pump control and feedback are also provided for.

An aerial farm robot might have one or more built-in cameras (such as black and white, high-resolution color, and night vision) to support vision based applications that provide functionality such as field mapping, or row and plant optical recognition.

2. Base Station

A base station can simply be a mobile platform that is mounted on one or more vehicles. In more complex arrangements fixed based stations can also be used. A base station—an example of which is in FIG. 15—can include the components shown in Table 2 below.

TABLE 2

| Components | Description |
| --- | --- |
| 1. Parking Rack | A rack where the aerial farm robots will park (i.e. landing) and initiate (take-off) operations from. It can also be used to safely store and transport several (30 to 50) aerial farm robots simultaneously. |
| 2. Refill Station(s) | Supply stations that are used to fill the reservoir of the aerial farm robot with the product that is being applied into the field. The container of the toolset is filled automatically with the correct quantity after the aerial farm robot flies under a supply spigot. There are two types of refill stations according to the material to be handled as described below: |
| a. Liquid/ Premix | Equipment that consists of several tanks and is used to mix products to the final product required for application. |
| b. Solid/ Seed & Fertilizer | A bunker with a rolling band that measures dosages of solid granular or powder form products into a hopper that will automatically refill the reservoir of the aerial farm robot toolset. |
| 3. Battery Change/ Recharge Station | A device that is used to automatically change and recharge batteries for the aerial farm robots. |
| 4. Control System | A rugged mobile computer that provides all the processing for the logic to manage the autonomous operations and storage of log files. |
| 5. Communication System | A mesh based wireless network system that provides a reliable Wi-Fi network across the work area. Radio transmitters and receivers provide one- and two-way communication between the base station and aerial farm robots. |
| 6. GPS Base Station | A GPS based reference point to provide RTK corrections. |
| 7. Power Supply | Some form of electric power supply from the mains net or from a generator or solar cells that can supply the system and its various components, including the continuous required battery recharging necessary to power the aerial farm robots in operation. |
| 8. Weather Station (Optional) | Optionally the digital inputs of a weather station may be connected to the control system to measure local weather conditions as these are often integrally linked to field application conditions. The Weather Station would measure: wind strength, wind direction, leaf wetting factor, direct sunlight, relative humidity, precipitation, temperature, and air pressure. These can then be used in a service order to determine if weather conditions are acceptable for service order execution. |

3. Regional GPS Base Station

A regional GPS base station is used in this example to provide regional RTK corrections to mobile base stations in the area.

D. DETAILED DESCRIPTION OF AERIAL FARM ROBOT

As shown in FIG. 4, each aerial farm robot includes motors 320 mounted on a frame 315, and electronics and communication equipment 310 attached to the frame 315. The number of motors 320 can vary from 3 (tri-copter) to 4 (quad-copter), 6 (hexa-copter), 8 (octo-copter) or more depending on thrust required. The aerial farm robot also includes a reservoir 305 attached to the frame 315 with a toolset 330 mounted on the reservoir 305. Toolsets 330 can be attached and detached depending on the farming tasks to be performed by the aerial farm robot.

A reservoir 305 is centered in the middle of the frame 315, since an aerial farm robot's center of weight has to be in the middle. We tested two different attachments of the reservoir 305 to the frame 315. In the first case the reservoir 305 was attached through the frame 315 with an opening at the top of the reservoir 305 used to refill the reservoir 305. In the second case the reservoir 305 was attached underneath the aerial farm robot with an opening and valve located at the side of the reservoir.

Toolset engineering can vary depending on the task and local conditions. Some of the designs of toolsets we used with the aerial farm robot are discussed below.

An aerial farm robot can carry a toolset to spray liquids, using a vacuum pump attached underneath of the reservoir as shown in FIG. 5. Depending on desired coverage we can deploy either one or two spray heads, as shown in FIG. 5. A sample spray head is shown in FIG. 6.

It is important to provide uniform coverage of a field with fertilizer. The volume of fertilizer per hectare can vary. If we know the volume, sprayer coverage band (for example, 30 centimeters), and aerial farm robot speed, we can easily calculate the intensity of fertilizer application (for example, 5 grams per second). The intensity is controlled by changing the pressure of the mini-pump attached to the reservoir and creating nozzle pressure.

An aerial farm robot can carry a planting toolset. As part of the setup preparations an appropriate seed distribution wheel is selected and exchanged with the seed distribution wheel already in place. The seed selection wheel needs to have the right size cavities appropriate for the size of the seeds that will be planted. The reservoir is filled with seed through the reservoir refill funnel. The seed stored in the reservoir is separated one by one by an exchangeable seed selection wheel with cavities the size of one seed.

Once the aerial farm robot with the planter toolset has reached the appropriate location, it lowers itself by flying down to ground level. There the spade drill bit puts downward pressure on the ground surface. The electric drill motor then starts running to drill a hole in the ground. Upon reaching the appropriate depth the electric drill motor comes to a halt. The seed selection wheel rotates through the seed selection wheel motor to deposit a seed in the seed guide that guides the seed to fall into the hole. Immediately the aerial farm robot lifts a little (about the height of the seed) and starts reverse rotating the spade drill bit. It then lifts further to exit the hole while rotating the spade drill bit in reverse, causing the seed to be covered with soil.

FIG. 7 shows a simplified example of the various toolsets that can be adapted to the aerial farm robot system for planting purposes. Various other more detailed implementations and variations are possible that can be adapted to local conditions.

An aerial farm robot can also apply fertilizer in various ways, including inserting the fertilizer into the ground and broadcasting it from the air. Here we describe both those methods, but there are others as well.

To place fertilizer into the ground, the aerial farm robot is fitted with a localized variable depth fertilizer toolset, and its reservoir is filled with fertilizer or correctives through the reservoir refill funnel. The aerial farm robot then flies to the appropriate location, where it lowers itself by flying down to ground level. There the spade drill bit puts downward pressure on the ground surface. The electric drill then starts running to drill a hole in the ground, while at the same time the auger pushes fertilizer downward to the distribution ring. Upon reaching the appropriate depth, reverse motion of the spade drill bit releases the fertilizer into the hole that was made. Further reverse motion of the spade drill bit and simultaneous upward motion of the aerial farm robot mixes the fertilizer with the soil and closes the hole.

The reservoir has an auger running through the middle attached to an electric motor that receives commands from the toolset control unit. The electric motor, through the electronic speed controller of the toolset control unit, regulates the amount of fertilizer distributed with the auger from the reservoir to the distribution ring. At the outlet, distribution rings of various thicknesses can be inserted to regulate the amount of fertilizer distributed.

FIG. 8 shows a simplified example of the various toolsets that can be adapted to the aerial farm robot system to distribute fertilizer on a localized variable depth basis, as discussed above. Various other more detailed implementations and variations are possible.

An aerial farm robot can also apply fertilizer to crops by broadcasting it through the air. In that case, the aerial farm robot is fitted with an exchangeable broadcast fertilizer toolset and its reservoir filled. The aerial farm robot then flies to the appropriate location, where it starts turning the auger that runs through the middle of the reservoir to dispense the fertilizer. The natural vibration of the aerial farm robot together with the downward angle and the grooves of the distribution plate cause the fertilizer to be distributed in an even manner. In addition to controlling the amount of fertilizer distributed with the auger by regulating the speed of the electric motor, the distribution ring can be exchanged or adjusted to regulate the quantity of fertilizer distributed.

FIG. 9 shows a simplified example of the various toolsets that can be adapted to the aerial farm robot system to distribute fertilizer on a broadcast basis, as discussed above. Various other more detailed implementations and variations are possible, including ones that work with distribution scales that vibrate or rotating disc distributors.

In addition to the toolsets listed above, the aerial farm robot can also support harvesting toolsets for various grains, fibers and other farm products. In addition, it can support other toolsets that use a variety of pest control methods, from simple localized herbicide or insecticide applicators to new and experimental systems that use lasers, vision, and high voltage localized electricity to zap insects or weeds.

TABLE 3

| Task/Toolset | Description |
| --- | --- |
| Harvesting | Harvesting through various attachments that are adapted to each individual crop. Can also replace hand harvesting of various fruits and other crops. |
| Spot Weed Control | Through laser, electric zapping, or localized herbicide application |
| Band Weed Control | Localized herbicide application in bands |
| Crop | Insect/plague monitoring and nutrition levels |

TABLE 3-continued

| Task/Toolset | Description |
| --- | --- |
| Monitoring | (spot or broad field based) |
| Pruning | The cutting of unwanted branches or the inhibition of growth of unwanted branches/buds with electricity, laser or chemicals to inhibit growth. |
| Topping | Increased productivity can be achieved with several plants by removing the top (or stunting the growth of the top part) from the plant. As hand labor was almost always needed for this operation, it was never economically feasible. The aerial farm robot may bring this in reach of being economically feasible. |
| Spot Insect Control | Through laser zapping, electric zapping, or localized insecticide application. |
| Soil Sampling | Through special moisture probes and/or cameras. |
| Heat stress monitoring | Through special cameras that can measure leaf temperature variations |

In order to accomplish autonomous missions, in this example each aerial farm robot carries the following on-board electronics, as shown in FIG. 10:

A power unit 250 is responsible for supplying power to motors 290, toolset 300 and all on-board electronics 200. A power distribution board 255 is connected to one or more batteries, depending on requirements, as part of the rechargeable power supply 295. In this example we use 12V LiPo batteries as our power supply. Power voltage requirements for different boards may vary. Currently we use a 3.3V power adapter 260 to power the GPS board 225 and Wi-Fi board 240, a 5.5V BEC adapter 265 to power the autopilot unit 205 and toolset control unit 275, and 12V for powering the motors 290 and toolset 300.

The system always needs to know the current state of the aerial farm robot batteries. In order to monitor battery discharge and condition, we use an energy consumption and voltage meter. The meter allows us to obtain and report current battery status back to the control station. The control station can then decide when the batteries should be changed, recharged or replaced/discarded.

A communication unit 230 is responsible for the exchange of control information with the remote ground control station, and getting RTK corrections and emergency information. Each aerial farm robot is connected to a local network through a Wi-Fi link and is represented as an independent network device with its own unique IP address. Such set-up allows us to almost eliminate one-to-one radio links and standardize all communication over the Ethernet protocol. In particular, all mission commands and telemetry information are sent over Wi-Fi.

Peak performance of the newest Wi-Fi implementation 802.11n is about 300 Mbps. It is well-known, however, that the throughput number will fall considerably when clients move further away from the base station. Still, in real field conditions we can expect at least 50 Mbps bandwidth. In order to maintain timely aerial farm robot location and status information, we need to collect telemetry data at least every second. Assuming that each telemetry record is approximately 1 Kb we conclude that a 802.11n network can support up to 50,000 aerial farm robots in this idealistic scenario. In real life, the more clients interacting with the network the more collisions we will get, hence the throughput of a Wi-Fi network decreases non-linearly.

A one-way radio-link can be used, but normally only for back-up and broadcast of emergency information, such as a "Fly Home and Park" command.

A high-precision positioning unit is responsible for getting the precise coordinates of a mobile unit. It includes a high-precision GPS/GLONASS board with a GPS/GLONASS antenna. Currently there are commercial GPS boards available which provide up to 5 cm precision in an X,Y coordinate plane. While GPS produces vertical coordinates as well, it is usually less precise then for horizontal coordinates. The landscape is not always flat, which can pose problems for precise vertical positioning. That is why sonar is usually the preferred mean to control vertical positioning of aerial farm robot. The height of application affects the width of the application band and the concentration of fertilizer, and should be tightly controlled.

A toolset control unit is responsible for controlling attached toolsets, such as a spraying toolset, planting toolset or fertilizing toolset. The control logic has much in common between those toolsets, allowing us to re-use the same control unit. The toolset control unit is described in more detail below.

An optical flow sensor is optional, as an addition to the positioning unit. In some cases an optical flow sensor helps to improve flying precision. It depends on algorithm used for position and attitude control implementation.

Modern GPS technologies allow for high-precision positioning with centimeter-grade accuracy. Under ideal conditions, accuracy can reach sub-centimeter levels. In order to achieve such precision, RTK-corrections are typically used. In order to use RTK-corrections, there should be two GPS devices, one called a "base station" or "reference station" to be set up in a fixed location, and another called a "mobile unit" or "rover." The base station should know its own GPS coordinates with maximal precision. The base station rebroadcasts the phase of the carrier that it measures, and the mobile units compare their own phase measurements with the ones received from the base station.

With traditional RTK, the position accuracy for the RTK solution degrades as the users gets further from the base. This is known as "PPM error," where PPM stands for "parts-per-million." In practical terms, the PPM error means that the RTK error increases by 2 centimeters for every 10 kilometers the rover is from the base.

There are several ways to transmit a correction signal from base station to mobile station. The most popular way to achieve real-time, low-cost signal transmission is to use a radio modem, typically in the UHF band. In most countries, certain frequencies are allocated specifically for RTK purposes.

In this example, to unify our communication infrastructure, reduce number of on-board antennas and increase maintainability of the system, we deliver RTK corrections over Wi-Fi, as shown in FIG. 11. Since RTK corrections do not require high update rates (typically once per second) we do not expect a serious increase in Ethernet traffic. However, if we find that with a large number of aerial farm robots on the network the network gets congested, we may fall back on radio transmission of RTK corrections.

An alternative that could potentially provide greater accuracy is a locally-deployed, terrestrial-based radio frequency positioning system using pseudolites that are spatially diversified operating on multiple frequencies other than GPS.

There are certain limitations on GPS positioning of moving units. Even the best GPS boards calculate position with a frequency of 20 Hertz or below. This means that new coordinates are calculated every 0.05 seconds. With the typical aerial farm robot speed of 10 meters per second (36 kilometers per hour), we get a worst case precision of only 50 centimeters. This means that between coordinate measurements an aerial farm robot can deviate from its correct trajectory by up to 50 centimeters. In real life, however, while flying along straight lines the deviation can be made much smaller, to hold within the error stipulated by GPS precision (about 5 centimeters).

In real life, while flying along straight lines to the next waypoint the deviation depends on two factors: GPS measurement accuracy (+/−5 centimeters), and the dynamic deviation from trajectory between waypoints due to errors related to the aerial farm robot's attitude control software. For the simplest and most generic algorithm based on waypoints navigation, the dynamic error can be tuned and minimized by adjusting distances between consecutive waypoints, as shown in FIG. 12.

However, more specific and precise navigation algorithms will optimize deviation from the trajectory not from standalone waypoints, but from an entire straight line. Such algorithms will result in further improvement in trajectory precision.

In our outdoor field tests, we achieved centimeter-level deviation from a straight line trajectory by using APM2 Ardu-Copter autopilot software. Trajectory precision for autonomous flight depends on, apart from the quality of the IMU (an inertial measurement unit usually consisting of an accelerometer, gyro and magnetometer), the aerial farm robot speed, its thrust-to-weight ratio, the arrangement of waypoints along the trajectory, and the aerial farm robot's PID (proportional, integral, and derivative control) values. It also depends on wind.

In order to increase precision at the end segments of a straight-line trajectory, as shown in FIG. 13 we extend the flight path on both sides into stabilization zones, allowing the aerial farm robot to stabilize on sharp turns and making the trajectory smoother.

We believe that by further tuning aerial farm robot hardware and software we can consistently achieve, in real-life field conditions, sub-centimeter grade trajectory band precision centered on the ideal trajectory.

Wind may badly affect precision. There are special devices to measure wind. However, the aerial farm robot itself can act as a wind sensor. If it tries to hold a precise GPS position, it will push against a wind with the same speed.

Also, we should mention that the APM2 PID controllers are designed in such a way that they can compensate for wind, after some stabilization time. Using GPS together with dynamic wind compensation algorithms lets us keep an aerial farm robot precisely under control even in strong wind conditions.

Optionally the digital inputs of a local weather station as part of the base station may be connected to the control system to measure local weather conditions as these are often integrally linked to field application conditions and decisions that could be entered as part of the service order. Stopping and starting execution of service orders is appropriate when these parameters are exceeded.

All four types of toolsets discussed above are controlled by similar logic.

TABLE 4

| | | Sprayer | Broadcast Fertilizer | Planter | Depth Fertilizer |
|---|---|---|---|---|---|
| Controls | Intensity | Yes (pumping pressure) | Yes (auger speed) | No | No |
| | Drill/Auger CW/CCW/Off | No | No | Yes | Yes |
| | Step | No | No | Yes (move step to release seed) | No |
| Signals | Empty reservoir signal | Yes | Yes | Yes | Yes |
| | Depth of drill signal | No | No | Yes | Yes |
| | Ground touch signal | No | No | Yes | Yes |

For example, the intensity parameter is translated to pumping pressure for a sprayer and to auger speed for a broadcast fertilizer. For spraying, the main control unit will send predefined commands to the toolset control unit: for example "set (intensity, 0.8)" will set intensity of fertilizer application to 80%.

The drill/auger clockwise/counter-clockwise rotation works the same for the planter and the depth fertilizer.

The parameter step is only applicable to a planter as it controls the seed selection wheel.

Note that controlling aerial farm robot height for a planter or a depth fertilizer is performed by the main control unit at the same time as it sends control signals to the toolset control unit.

When the reservoir is empty the pump should stop pumping and the toolset control unit should send a signal back to the control program. The control program then passes coordinates of the end point back to the control station so that the control system is aware where to begin the next field application.

While controls are used in the direction of from the control program to the toolset control unit and then to the toolset itself, signals are used to deliver information in the opposite direction—in other words, from the toolset to the toolset control unit and then to the control program. There are currently three types of signals, but additional signals may be needed.

Note that from the point of view of the toolset control unit interface, the sprayer, the broadcast fertilizer, the localized depth fertilizer, and the planter are similar. As a result, these controls can be implemented through electric DC motors with appropriate electronic speed controls (ESC) incorporated as part of the toolset control unit interface.

It is very frustrating and costly to lose an aerial farm robot. We can use different levels of protection in order not to let the aerial farm robot get lost. Aerial farm robots constantly exchange telemetry information with the control system. We can code the control system so that if communication is lost while an aerial farm robot is flying a mission, it completes its mission, flies back to the Control Station, and lands in its allotted storage/parking slot.

Although not really required for autonomous flights, for the safety reasons we may also implement the logic that if aerial farm robot communication is lost for more than a given interval, such as 10 seconds, then it should return and land.

An aerial farm robot also listens on a radio channel which is independent from the Wi-Fi channel. Upon receiving emergency instructions, it will terminate its mission, possibly drop remaining filler, and fly back.

Since the aerial farm robot is equipped with a GPS antenna, its location is known to the operator while the aerial farm robot is connected to Wi-Fi network and its batteries are still working. The operator also knows the last point where the aerial farm robot was "visible."

In order to protect against fly-aways, an aerial farm robot can also be equipped with an autonomous GPS-GSM tracker, allowing its location to be tracked within the reach of general-purpose GSM networks.

Each aerial farm robot in the System has a unique aerial farm robot ID. The ID should be easily readable by refilling and recharging platforms (for example, by QR-code) and by humans.

How many aerial farm robots do we need in order to conduct robust application missions? Here we provide a real-life case with a real 4,000 hectare farm.

TABLE 5

Aerial farm robot speed: 20 km/hour
Spray coverage band: 0.5 m
Aerial farm robot payload: 1000 g
Spray Volume: 20 l/ha
Assuming an aerial farm robot does half-time application and half-time flying to mission/refilling, in 1 hour 1 aerial farm robot can
spray 20,000 m * 0.5 m * 0.5 = 0.50 hectares
This will require 10 liters of premixed spray liquid, which is equal to 10 refills.
Assuming that an aerial farm robot can fly about 10 minutes on a battery, we will also need 5 recharges for one hour.
In 10 hours 1 aerial farm robot can spray 5.0 hectares. In order to tspray he whole farm every 5 days we will need 4000/10/5 = 160 aerial farm robots.
We assume that recharging happens almost instantly by exchanging batteries,
so we need a large enough supply of spare recharged batteries to keep operations going smoothly.

E. DETAILED DESCRIPTION OF AUTOMATED FARMING

There are different degrees of autonomy and decision-making which can be granted to aerial farm robots. The logic of splitting field into sets of service band segments in any case belongs to the control system. Each aerial farm robot while leaving for a service run is loaded with a mission plan. The plan contains the set of band segments to be serviced during the course of the mission.

A sample of mission plan execution logic is shown in the block chart of FIG. 14. Under normal circumstances, an aerial farm robot while on a mission does not need to update its mission plan.

In prior art systems like the YAMAHA RMAX helicopter sprayers, an operator must control the helicopter at all times. In our system, the operator gives a command, and the command is executed autonomously. There are two conceptually different way to control aerial farm robot operations to achieve this autonomy: local control and central control.

With local control, a control program gets loaded into the memory of an on-board processing unit and the aerial farm robot independently executes this program. Such a program typically will contain commands like TAKE-OFF, GOTO POINT, START SPRAY, STOP SPRAY, LAND.

With central control, an aerial farm robot's current position in space gets continuously tracked and its position transmitted to a land-based computer. The computer continuously sends direction and speed commands to the aerial farm robot in order to keep it on a predefined trajectory. The trajectory is maintained by the land computer.

Typically, to carry out central control the aerial farm robot's position has to be relayed to the control station in real time. This is unlike telemetry data which is typically relayed back to the control station in pseudo real time, for example with a delay of up to 1 to 5 seconds.

We can also imagine a hybrid scheme where the actual field application is centrally controlled, while miscellaneous operations such as start, flight to field and back, landing, and refill are locally controlled. The advantage of such a hybrid approach is that (1) we do not need expensive GPS boards, and (2) it is rather simple to guide an aerial farm robot flying along straight lines. At the same time, it is logically simpler to do miscellaneous tasks in a local control mode.

In the case of both local and central control, the aerial farm robot system is autonomous in the sense that no human is involved.

Depending on the farm size and distances within the farm, both mobile and fixed base stations will be supported. As shown in FIG. 15, the base station includes the following components described below in more detail:
    Control Center
    Communication Center
    Parking Rack
    Hovering Area
    Recharge Station
    Refill Station
    Weather Station (optional)

Both the control center and the communication center can be located separately from the rest of the base station. We envision at least two different setups, as shown in FIG. 16:
    (1) The base station is mobile, with the control center and communication center being part of the base station and also mobile and located in close proximity with the rest of the mobile base station.
    (2) The base station is mobile or stationary, and the control center and communication center are located separately at another stationary point, for example within a farm administrative building.

Since the main part of the control system is represented as a Web-based system, it is possible to set up a control center on a general-purpose host server and use it remotely over the Internet. But this would require a very solid and reliable Internet connection, which is not always available at a typical farm.

As shown in FIG. 17, the control center includes one or more servers running the main application, a database server, and a number of operator terminals. It also includes network hardware and hardware to control communications equipment. In a simple setup the entire system may run on a single server. In a more advanced setup, the infrastructure may contain several servers, networking hardware and operator terminals:

The communication center provides for the exchange of the following information between the control center and the fleet of aerial farm robots:
    Service order execution commands
    Service order execution status
    RTK corrections
    Emergency information broadcast
    Logging flight info
    Camera stream data
    Photos The parking rack is a simple structural holder that can be fashioned out of any structural material that will hold and protect several aerial farm robots. Aerial farm robots with their detachable toolsets land and take-off vertically using individual and unique flight corridors from and to their individual allocated slot in the hovering area, and from there into their individually allocated slot in the parking rack. Depending on the number of aerial farm robots supported, the parking rack can be mounted on a small pick-up truck or on a larger flat-bed truck or on top of a large mobile water tank so that it can easily be transported. After completing operations a cover can be located over the top of the parking rack to provide protection during transport or against adverse weather conditions. Optionally, a recharge station could be built into each of the parking rack holders, but due to cost and complexity we believe it is better to avoid this initially and to have only one separate recharge station.

The hovering area is a space demarked in the air with an allocated slot for each aerial farm robot. This slot is used by the aerial farm robot so it can move from and to, and within, the base station while avoiding a collision with another aerial farm robot. Each aerial farm robot will have its own individual flying lane (corridor) assigned to get to and from its allocated space in the parking rack to and from the hovering area. All other corridors within the base station will run to and from the hovering area based upon a pipeline concept controlled in availability and timing by the control unit.

The corridors within the base station are predefined flying lanes that allow multiple aerial farm robots to move from various locations within the base station to and from the hovering area in a controlled manner, so that no collisions occur. FIG. 18 shows how the corridor will look if sliced vertically.

Each aerial farm robot will have its own individual flying lane (corridor) assigned to get to and from its allocated space in the parking rack to and from the hovering area. In order to accommodate a large number of the aerial farm robots, in this example we use three-dimensional corridors where lanes are stacked both in the horizontal and vertical dimensions. In addition, a timing offset can be used depending on the location so that not all of the aerial farm robots try to land or take-off at once.

After a signal has been received by the control system that a particular refill or battery change operation has been completed, a pipeline concept using sequential operations is used to instruct the next available aerial farm robot to enter either the refill station corridor or the battery recharge station corridor from the hovering area.

Predefined individual flying lanes demarked in the air provide for access between the base station and the field. These are structurally similar to the corridors within the base station. A base (center) line will be allocated by the operator using the control system. Depending on the number of aerial farm robots supported, the actual size and height of the corridor will be calculated based upon parameters in the system to stack the individual flying lanes both horizontally and vertically using the base line as the center of the stack of individual flying lanes. In addition, the entering into the corridor will be commanded by the control system using timing offsets so that the aerial farm robots enter the corridor one after another. A minimum flying height needs to be configured for safety and obstacle-avoidance. This needs to be set in order to avoid aerial farm robots from hitting humans, animals, mobile farm equipment and obstacles such as power lines.

In other implementations we may install on-board collision avoidance sensors, or use swarming type software, but these approaches will increase the cost, complexity and maintainability of the system.

When the inputs are used up while an aerial farm robot is executing a service order in the middle of a field, the aerial farm robot rises a certain number of meters in the air within a predefined interval, goes to the boundary of the field, and then flies through the corridor connecting the field with the base station. For large fields, there could be several corridors predefined, as shown in FIG. 19.

There is also a belt corridor around the base station defined to regulate aerial farm robot traffic near the base station.

Since the possibility of a collision is much higher near a base station than everywhere else, the control system may preempt control over an aerial farm robot as soon as it approaches the belt corridor. The control system then guides the aerial farm robot step-by-step as it refills, changes/recharges batteries, hovers, lands and/or parks. This approach can be used instead of or together with using individual predefined flying lanes.

Each aerial farm robot will have its own hovering slot allocated in case it needs to wait for its turn to access a particular Station. Each Station has its own access corridor to avoid collisions. Access slots and priorities are assigned by the control system based upon its parameterization. If hovering wait times become excessive, the aerial farm robot will land in its parking rack in a predetermined fashion.

Another method to avoid collisions and to manage aerial farm robot air traffic within the farm that could be adopted as an alternative is to let the aerial farm robots communicate in real-time with each other based upon some of the common swarm control models.

The base station provides a place for aerial farm robots to refill their reservoirs. FIG. 20 shows an aerial farm robot refilling its reservoir for crop dusting applications. FIG. 21 shows an aerial farm robot refilling its reservoir for planting or solid fertilizer applications.

The base station provides an automatic carousel battery charger/changer for aerial farm robots to obtain charged batteries. Since in this example we opt for complete process automation, we also have to automate the battery recharge/replacement procedure. We assume that an aerial farm robot can fly about 20 minutes on one set of 4 batteries, we need to replace batteries 3 times per hour. On average one recharge cycle takes approximately 60 minutes. In order to keep an aerial farm robot continuously operated we need 8 batteries continuously recharging and 4 batteries on-board. To support 100 aerial farm robots we need 800 batteries being recharged each moment in time.

One can use an automatic carousel changer/recharger like that shown in FIG. 22.

As shown in FIG. 22, the aerial farm robot descends right in the middle of the carousel, its side-bars getting fixed in the holders. At least one set of four batteries slots is always empty. Firstly the aerial farm robot rotates in such a way as to place its batteries into empty slots. Then it is rotated to collect the next available recharged set of batteries. For a mid-sized X525 copter frame the carousel radius needs to be about 20 cm with a circular arch length of approximately 120 cm. A typical LiPo battery consumes about 2 to 3 centimeters of space when placed on its edge.

This means that we can accommodate up to 40 batteries being simultaneously recharging and about 20 empty slots on one carousel. For larger frames the number of battery slots will grow proportionally to frame size. In FIG. 23 the 12 batteries fit on a quarter of the carousel, meaning that total number of batteries is 4*12=48. One slot is dimmed empty to illustrate that we need that slot to release a discharged battery into.

The carousel itself is connected to an AC power line, and uses a powerful AC/DC power supply. Since we currently use lithium polymer (LiPo) batteries for powering aerial farm robots, we also need specifically designed power module for battery recharge/balancing. Each LiPo battery includes a number of semi-independent cells producing 3.7 V each. We currently use 3-cell LiPo batteries since they produce the required voltage. We suggest using a single IGBT (or MOSFET) power module for each of the batteries, as shown in FIG. 24. The charging carousel module receives 12V DC as its input and has a charging/balancing block per battery or per cell controlled by a shared control board.

Some applications and attachments may require heavy power usage in the field, in which case it may be practical to adopt a remote in-flight laser charging system that is used in conjunction with a solar cell on the aerial farm robot by aiming a laser beam at the solar cell and thus recharging the aerial farm robot's batteries.

A communications network links the base station and the fleet of aerial farm robots, as shown in FIG. 25. It includes wireless networking equipment at the base station and wireless networking equipment (antennas, Wi-Fi boards, etc.) on board the aerial farm robots.

In this example we do not use aerial farm robot to aerial farm robot communication, but such communication is supported since from the networking prospective each aerial farm robot is just another independent networking device. By adding more intelligence to selected aerial farm robots we can turn them into flying control stations which will carry part of the base station functionality and control other aerial farm robots.

The control system is the computer software system specifically developed to control operation of the base station and the fleet of aerial farm robots. The main task of the control system is to optimize and control execution of service orders in the most reliable, safe and efficient manner. In order to achieve this task the control system supports the functionality described below:

Farm Mapping—The operator takes a Google (or similar) map and overlays it with more current and precise aerial photos taken by an aerial farm robot equipped with a camera. Then the operator can define fields and blocks (sub-fields) on the map by using a simple shape editor. It can also define the current location of the base station, the flight corridors and the hovering areas.

Band and Row Mapping—After the fields and blocks are defined in the system, the row direction and the width of the application band needs to be input by the operator. In case of broadcast fertilizer or aerial spray applications, the direction of the rows may differ from the direction of the crop rows. In the case of row specific tasks, such as planting, the band direction will usually follow the crop row direction. For row-specific tasks, the initial row starting and end points need to be marked by the operator. The system will split the field into bands and rows. These in turn will be divided by the system into band Sections optimized for the specific attributes of each service order.

Service Order Definition—Using the control system the operator inputs each of the parameters for a service order. If the base station has an optional weather station, weather related restrictions can also be specified as part of the service order. Once a service order is defined it can be executed.

Service Order Execution—When the operator executes a service order, the control system loads the service order instructions over the communication network. Based upon these instructions the aerial farm robot takes off from its parking rack and flies to the hovering area. It then changes batteries, if required, at the battery recharge station and then fills its reservoir with solid or liquid inputs at the refill station, and subsequently flies to the field where it will execute its allocated task. At the end of the task, either because the inputs in its reservoir are used up or the aerial farm robot reaches the end of its allocated band section, the aerial farm robot flies back to the base station hovering area to load a new task or to land in its parking rack.

Refill Reservoir—When the aerial farm robot arrives in the hovering area, it will provide a status update to the control system including whether its reservoir is empty. If the reservoir is empty, it gets assigned to a queue and when the allocated refill slot is available, it will fly via the relevant corridor to a spot under the refill point of the refill station. There an optical sensor will trigger the refill and the aerial farm robot will fly back to its allocated slot in the hovering space, leaving available the next slot for the next aerial farm robot to be refilled.

Battery Change/Recharge—Each aerial farm robot has an onboard battery monitor system. The control system can tell from the output from that monitor system output when the battery is low. If an aerial farm robot finishes its task, or has a low battery, the control system will decide whether to put the aerial farm robot into a hovering area to wait its turn to change batteries at the battery change/recharge station, or whether to land it in the allocated space in the parking rack to wait its turn for an open slot at the battery change/recharge station.

Default Error/Emergency—All aerial farm robots fly back via the allocated corridors to the base station and land in their allocated spaces in the parking rack. This happens automatically in the case of a communication failure or error or manual shutdown.

The farm control system includes land-based components communicating with on-board components over a communication network. The land-based components represent a classic Web architecture with a browser-based front-end, application server back-end, and a database.

The front-end supports efficient usage of the system by agronomists, operators and support engineers.

As shown in FIG. 26, the backend includes the following semi-independent modules:

Operator control module—this is the module where operators conduct their daily tasks, such as placing service orders, controlling aerial farm robots, and performing various administrative tasks.

Statistics module—various statistics get collected regarding what tasks were performed when, how fast they were performed, which aerial farm robots were used, how much liquid was used, how many times batteries were recharged, what distance aerial farm robots flew, etc.

Scheduling module—responsible for splitting fields into segments and scheduling coverage of each segment by aerial farm robots.

Device control module—responsible for communication with aerial farm robots, and collecting and storing telemetry data Mapping module—responsible for defining fields, patches, locations of obstacles and infrastructure elements. We can also allow for enriching cartographical information using aerial farm robots equipped with video or photo cameras and additional sensors. It will be possible to add new layers to the farm map: infrared view, insect distribution, humidity, etc.

A service order is a complete description of a task to be performed on a farm. See an example below:

TABLE 6

| | |
|---|---|
| Start | Oct. 10, 2012 |
| Location | Field 12 |
| Sub-Location | Entire Field |
| Type Operation | Broadcast Spraying |

TABLE 6-continued

| Volume | 50 liters p/ha | |
| Product 1 | Manganese EDTA | 0.3 liters p/ha |
| Product 2 | Glifosato | 2 liters p/ha |
| Field Application Speed | 20 km/hr | |
| Wind Speed | <5 km/hr | |
| Wind Direction | Not S or SW | |
| Sunlight Intensity | | |
| Application Time Slot | 16:00~9:00 | |
| Rain Expected | <12 hrs | |
| Humidity | >30% < 80% | |

The operator front-end allows an operator to create and to control service orders. The operator can create or edit a service order, and send it for execution. As can be seen in the sample service order in FIG. 27, the operator can schedule an order to start at a certain time, or can explicitly start its execution, pause it or cancel it.

As can be seen in the web page shown in FIG. 28, the operator can see a list of all orders, search for other orders, or review current, past or pending orders.

Operators should also be able to interactively choose service orders to be executed, or to stop/pause/resume a service order at any moment.

Operators can see up-to-date information on the fleet of aerial farm robots, including each of their location, status, and the like, as shown in the sample web page of FIG. 29.

As shown on FIG. 30, an operator can conveniently see the current situation of each service order on the farm's map.

As shown on FIG. 31, an operator can drill down to any particular field or block.

Maintaining maps, filling them with information, defining fields, obstacles, fly corridors, and so on are the specific tasks of trained GIS operators using special optimized Web or desktop interfaces and receiving information from aerial farm robots equipped with video and photo cameras and additional sensors.

In order to provide a high-level overview of the system to farm management and operators, the front-end includes overall statistics covering service orders, efficiency of operation, and aerial farm robot statistics, as the sample web page of FIG. 32 shows.

The control system uses a farm map with delineated fields, roads, buildings, etc. Each field corresponds to a physical continuous plot of arable land. Each field can be divided into physical or virtual blocks: for example, blocks (areas) within a field planted with different crops, blocks (areas) that are defined as border areas within the field, or blocks (areas) that need an extra one-time application. Fields and blocks are used as application units. The system operator can interactively edit the map to define field borders, blocks, buildings, or any other obstacles on the map. As the base of this component we use the Google Maps engine, but any other advanced GIS system can also be used.

This component is also used to define separate flying corridors back and forth to reduce the probability of aerial farm robot collisions.

When the control system starts executing a service order, it has to split a field or block into bands in the case of spraying and fertilizing, or into crop rows in the case of planting, and allocate aerial farm robots to those bands or rows. Since allocation algorithms are the same regardless of what type of operation is executed, we will describe the algorithms in terms of bands.

Also, there is no difference between field and block in regards to service order scheduling. We will use the term "block" to avoid ambiguity.

As noted above, the control system has to split a block into bands and allocate aerial farm robots to those bands. The main complication is that the control system can only approximately estimate the length of the active path which an aerial farm robot can cover based on reservoir capacity and application intensity. Due to various inaccuracies, the filler can be used up a bit earlier or a bit later than anticipated. This means that if we require that the reservoir has to empty out by the end of an active run, the scheduling algorithm has to be dynamic.

However, in the simplest case we can lift this requirement. Then we can set the safe length of active run with a guaranteed volume of filler (5-10% more than theoretically calculated) to cover the active run. In this case, an aerial farm robot will carry some unused filler back to the base station.

For further discussion, we assume that the aerial farm robot should completely unload its reservoir during active flight, which represents the more general case of the scheduling algorithm.

The scheduling module of the control system deals with splitting fields into aerial farm robot missions and assigning the missions to appropriate aerial farm robots. It also deals with optimizing the missions so that total service order execution time is as short as possible, keeping in mind safety concerns. We consider two allocation strategies.

In Strategy 1, the next available aerial farm robot is allocated to the next processed service run. In Strategy 2, the block is split into sub-blocks, with individual aerial farm robots allocated to individual sub-blocks.

As the first step of the both strategies the algorithm divides the field into service bands. Note that the direction of service bands is important. For planting the direction of the service band will usually go along real rows of plants, while for spraying it will usually go diagonally across the rows. In any case this direction has to be set by an operator.

In this example, the aerial farm robot path to a block, its active run, and its flight path back are internally represented as a waypoints sequence or waypoint program. This sequence is generated by the control system automatically and loaded into the aerial farm robot's "memory" before it leaves for a service run. In other implementations we may use concepts other than the waypoint mission concept.

The control system will continuously generate waypoint programs and load them on the next available aerial farm robot. Each service band segment is internally split into an appropriate number of waypoints. This is necessary to control trajectory precision. The decision on where to place such intermediate points can be made by on-board software or by the control system.

In this example for simplicity we can use a MAVLINK protocol (Micro Air Vehicle Communication Protocol) extended for our needs, which deals with individual waypoints. This means that all intermediate points are also calculated on the server side. In other implementations this can change, so that intermediate waypoints are calculated on board an aerial farm robot. FIG. 33 shows a screen that can be used for testing, tech support, and troubleshooting of a mission program.

FIG. 34 shows how an agronomist service order is being translated into a waypoint program through levels of abstractions:

As noted above, many strategies exist for allocating aerial farm robots to areas of the farm to carry out work orders. Here we will describe the two strategies mentioned above.

Strategy 1 is to allocate the next available aerial farm robot to the next processed service run. This approach allows us to seamlessly replace one aerial farm robot with another. There is no state associated with an aerial farm robot across two service runs. From the point of view of aerial farm robot resources usage, this is the most flexible approach.

However, this approach can be difficult to support, especially at the early stages of operation. Since the field will be covered by aerial farm robots in a semi-random and changing manner, it will be difficult to debug precision and quality problems, and to nail the problems down to one particular aerial farm robot.

Using this strategy, at each moment in time, the scheduling module collects status information regarding completed missions and generates the next service runs, as shown in FIG. 35. The scheduling module generates service runs slightly in advance so that as soon as the next refilled and recharged aerial farm robot becomes available, it can immediately be loaded with a service run.

The control system can choose the optimal strategy for sending a particular aerial farm robot to a particular block. There are many optimization algorithms which can be used by the scheduling module for building active runs. Selecting the best algorithm mostly depends on the ratio of active runs to block Length.

RunGamma=Application Path/Block Length

The higher this ratio, the easier the task of the scheduler. The main optimization criteria is the total time of service order execution. Currently, we use a simple algorithm which can be formulated as follows:
1. As soon as there are "long enough" contiguous segments, choose one of them.
2. When a long segment is finished, split the remaining "tail" into appropriate number of geographically subsequent zones. Each zone should contain a number of band segments with maximal total length not exceeding the length of one full active run.

With this algorithm some of the aerial farm robots will return some remaining filler back to base station, but this will affect overall performance only in minor way.

Note that one active run can span several service bands. An aerial farm robot sends a data record to the control system containing the coordinates of the point where the filler had run out. Each algorithm (unless we spray each block sequentially) will leave some gaps by the end of the service order execution. The control system will dispatch one or more aerial farm robots to service those gaps.

In FIG. 36, on the left-hand side we show a case with high RunGamma. In this case the first part of the application is easily parallelized and the major part of the field can be applied with maximal efficiency. Closer to the end of service order execution for a particular block, some gaps will remain between covered band segments. Spraying the remaining gaps can still be parallelized, but by a smaller number of aerial farm robots. In the case of a low RunGamma (we use an extreme case with RunGamma<1), the parallelization is harder, but there are many heuristic algorithms which can still be used. The control system will send one or more devices to close those gaps at the end of service order.

Strategy 2 is to split the serviced block into zones and allocate an individual aerial farm robot to each zone. The advantage of this strategy is that we know precisely which aerial farm robot services which part of the field. This understanding could be handy to chase down problems, for example, if an aerial farm robot is systematically deviating from its set trajectory or having problems with uneven distribution of chemicals through its sprayer.

The disadvantage of this approach is that one aerial farm robot cannot be easily replaced by another. If one aerial farm robot lags behind the rest of the aerial farm robots, the execution of the work order on the block will be defined by the slowest of the aerial farm robots. If an aerial farm robot is broken and requires service or replacement, then a new aerial farm robot has to be assigned to complete work on the zone.

F. CONCLUSION

In summary, our invention might include methods of farming where one or more autonomous flying robots are used to carry out farming tasks. That might include the operations of assigning one or more aerial farm robots to carry out farming tasks such as crop dusting, planting, fertilizing and the like on or for one or more plants, using the robots to deliver materials such as pesticides, seeds, fertilizer, and the like to the field or plants being farmed, directing the robots to plants or positions within a field, using the robots to perform the farming tasks, providing power to the robots, and having the robots return to a home base for more assignments, more materials and more power as needed.

Our invention might also include farming that is automated by including at least the operation of automatic refilling of a reservoir on one or more of the robots of farm inputs such as seed, solid and liquid fertilizer, crop protection chemicals, and water. That might also include the operation of using a battery changer to automatically exchange a robot's depleted batteries with charged batteries. Finally, that might include a base station with a location for storing or parking robots is provided and software and a communications system.

Our invention might also include an automated farming system that includes a subsystem that includes one or more aerial farm robots, a subsystem for parking or storing the robots when they are not operating, a subsystem for controlling the robots that allows them to operate autonomously, a subsystem for refilling the robots with farm inputs such as seed, solid and liquid fertilizer, crop protection chemicals, and water, a subsystem for recharging the robots with power, and a subsystem for communicating with the robots. Our invention might also include a subsystem for determining the position of the robots in a field.

Finally, our invention might include an aerial farm robot that includes means for moving above ground and plants being farmed, means for receiving directions to carry out farming tasks such as crop dusting, planting, fertilizing and the like, means for delivering materials such as pesticides, seeds, fertilizer, and the like to the field and plants being farmed, and means for obtaining power to move and to carry out the farming functions. Power obtained by the robot might be electrical power, conventional carbon fuel carried onboard the robot, power obtained from receptor solar cells carried onboard the robot which receive power from the sun, a tracking laser, or some other light source, or from a magnetron. Our invention might also include an aerial farm robot where the robot includes means for determining the position of the robot in a field, as shown in FIGS. 37 and 38.

G. THE DRAWINGS

Figure 27:
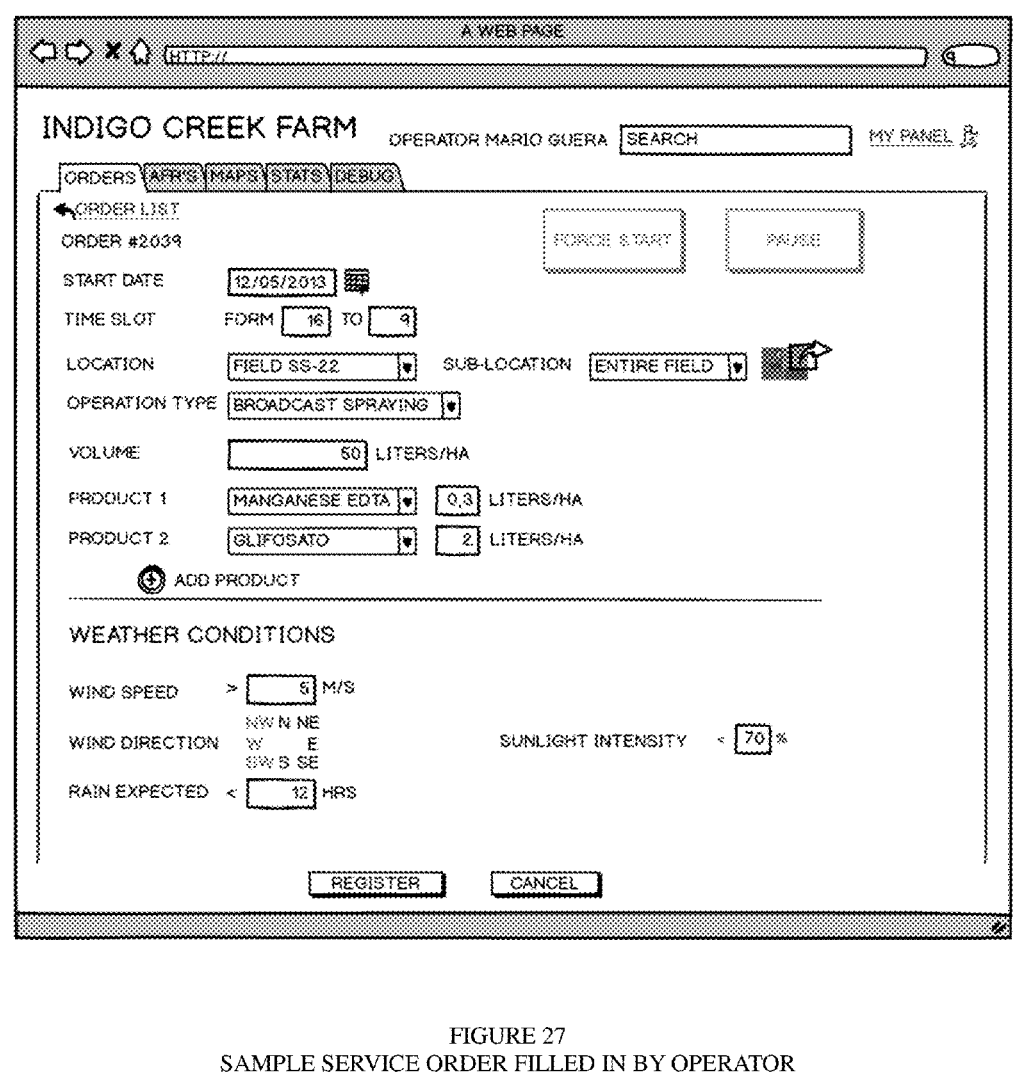

FIG. 27 shows a sample service order filled in by an operator.

Figures 28, 29:
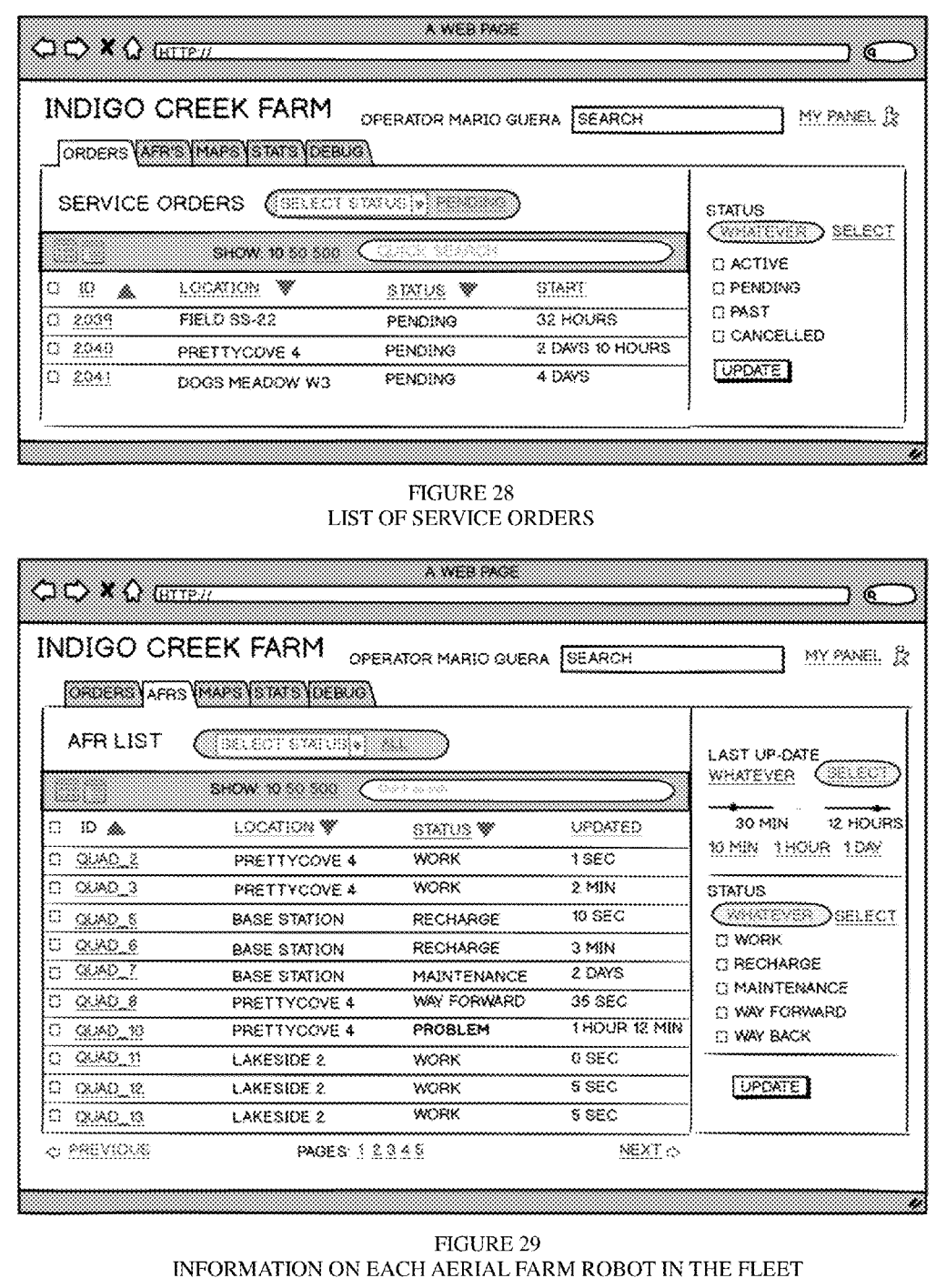

FIG. 28 shows a list of service orders for the past, present, and future.

FIG. 29 shows information on each aerial farm robot in the farm's fleet.

Figure 1:
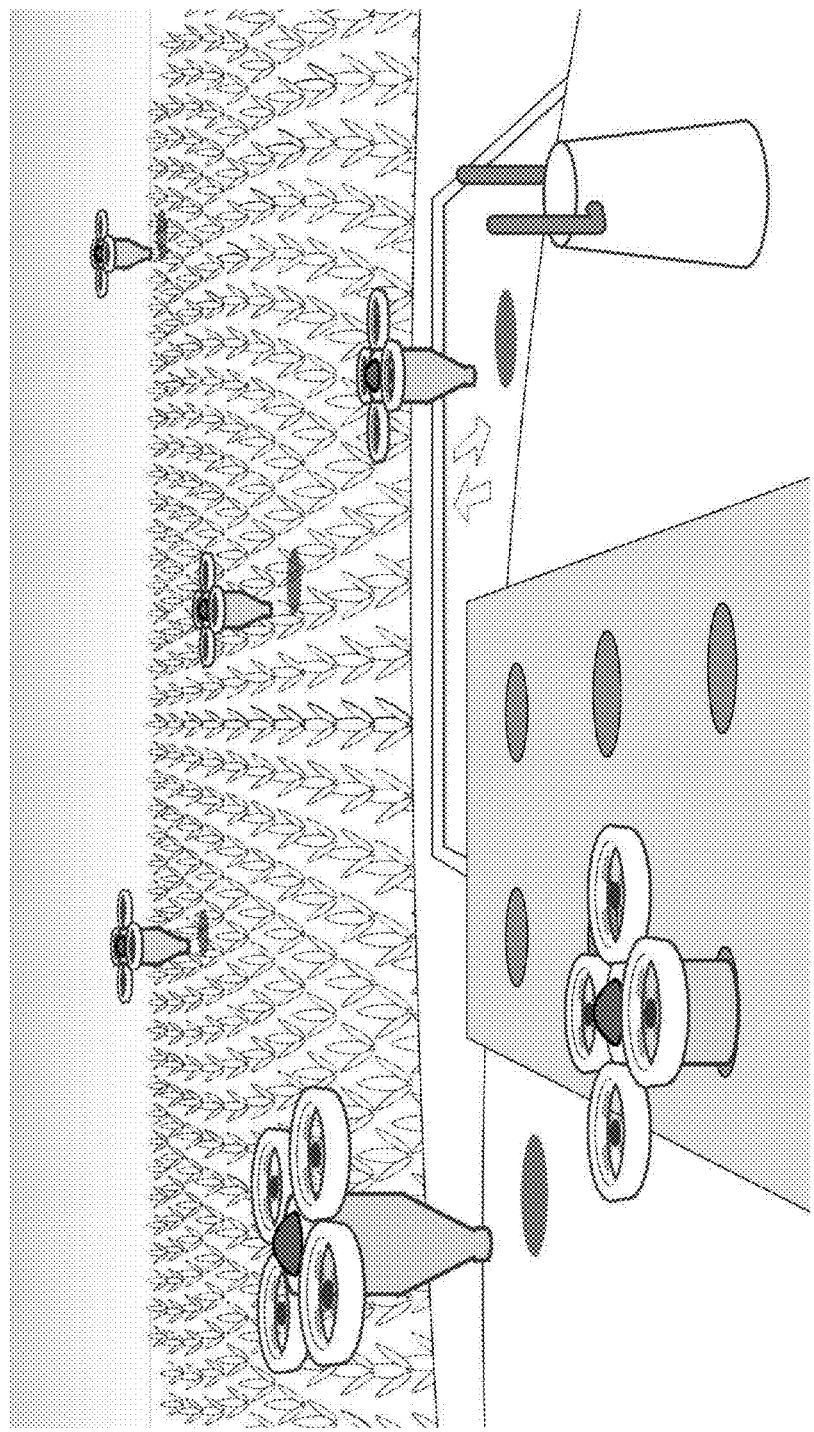
FIG. 1 shows an artist representation of an example system functioning in a field.
Figure 2:
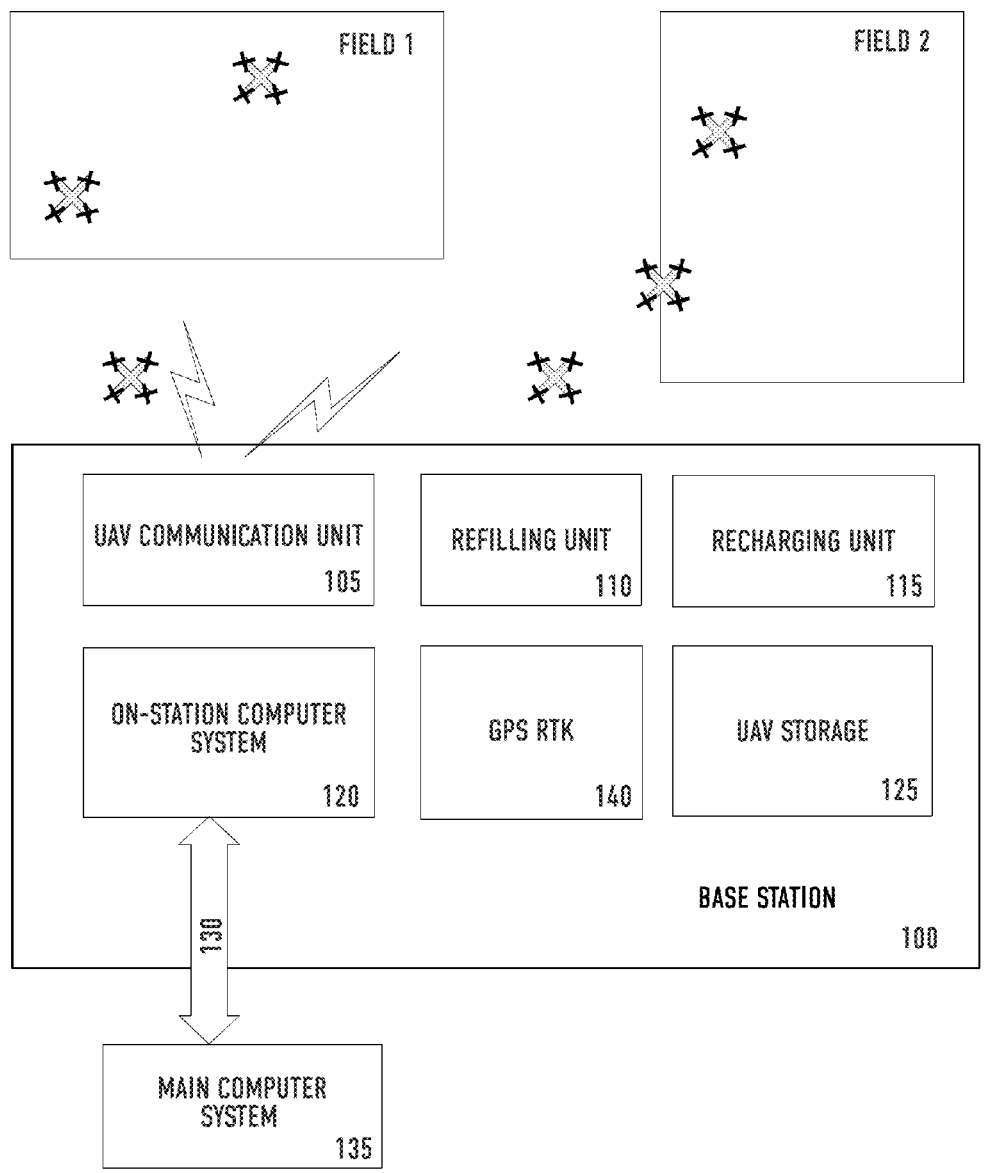
FIG. 2 shows an example system overview.
Figure 3:
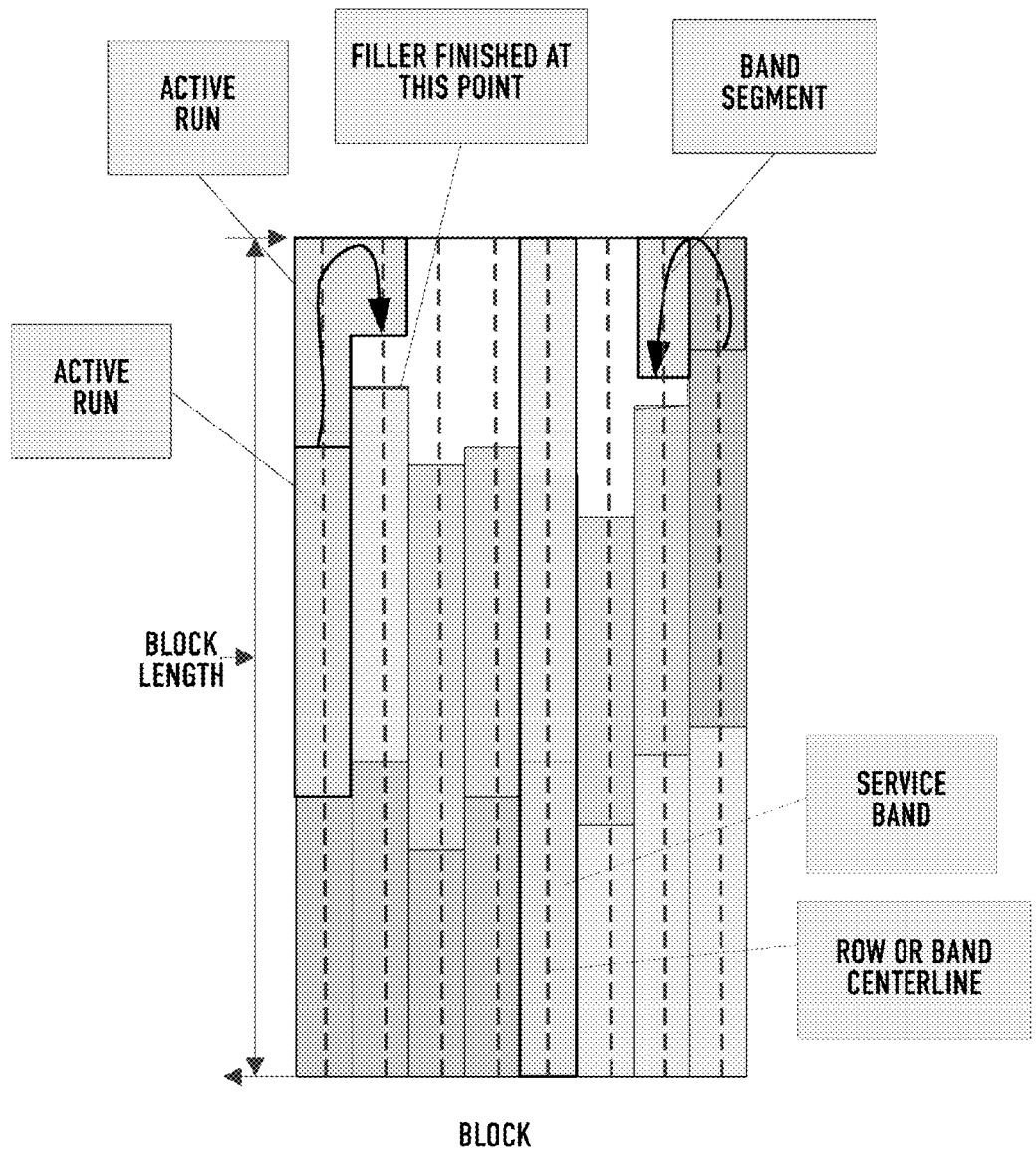
FIG. 3 shows a diagram of some terms relating to farming areas.
Figure 4:
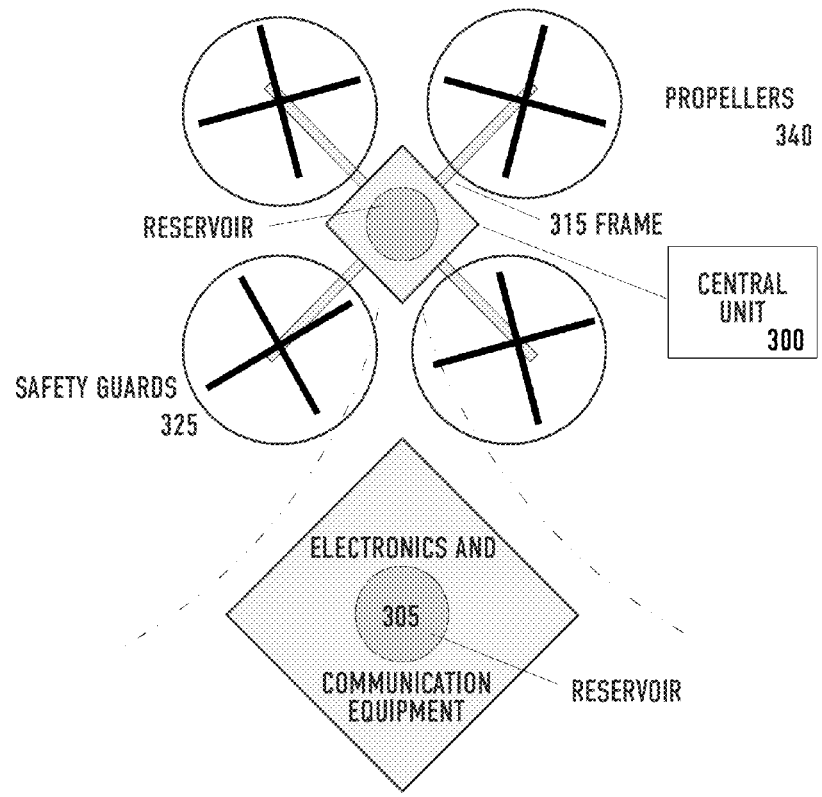
FIG. 4 shows a diagram of the structure of an aerial farm robot.
Figure 4:
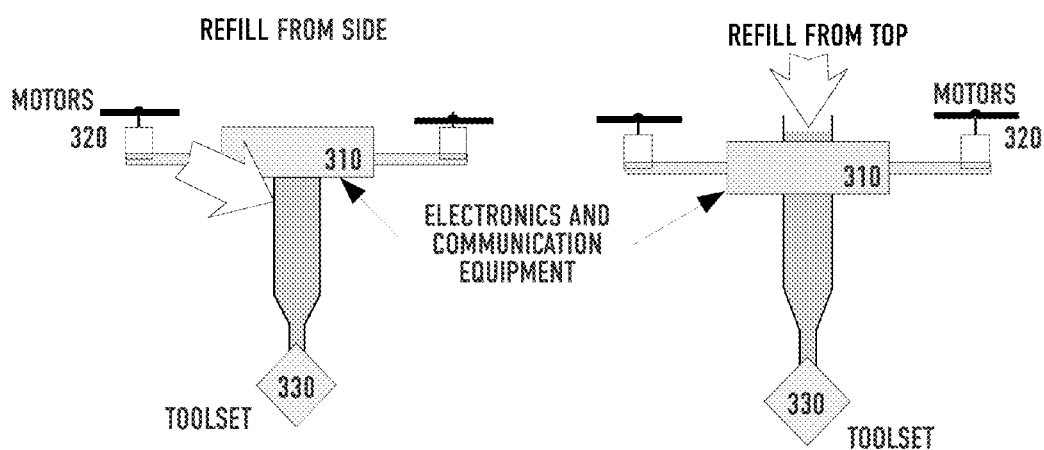
Figure 5:
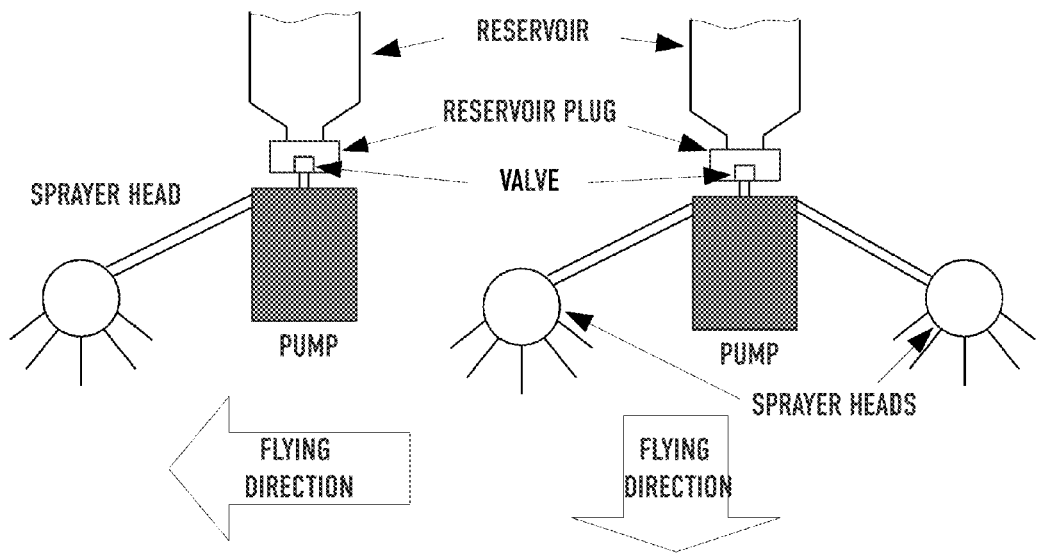
FIG. 5 shows the positioning of spray heads on an aerial farm robot.
Figure 6:
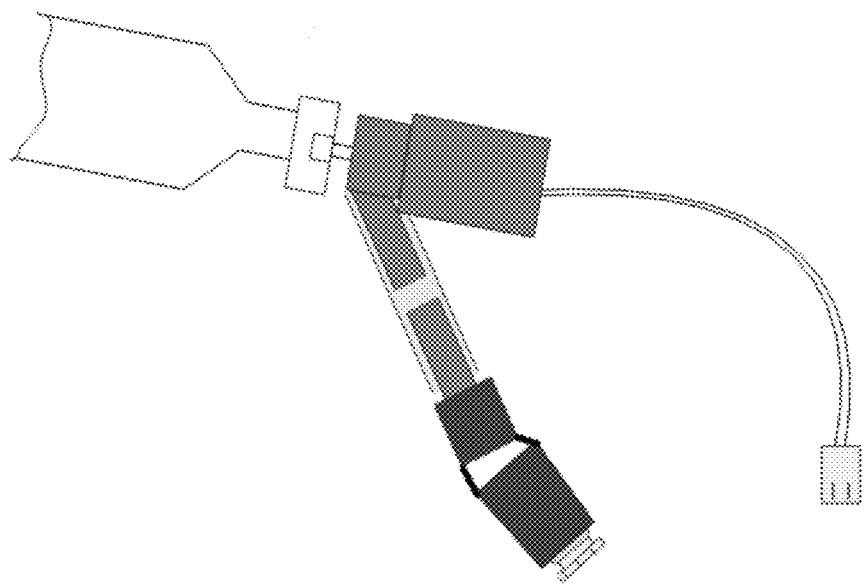
FIG. 6 shows a picture of one example of a reservoir and spray head for an aerial farm robot.
Figure 7:
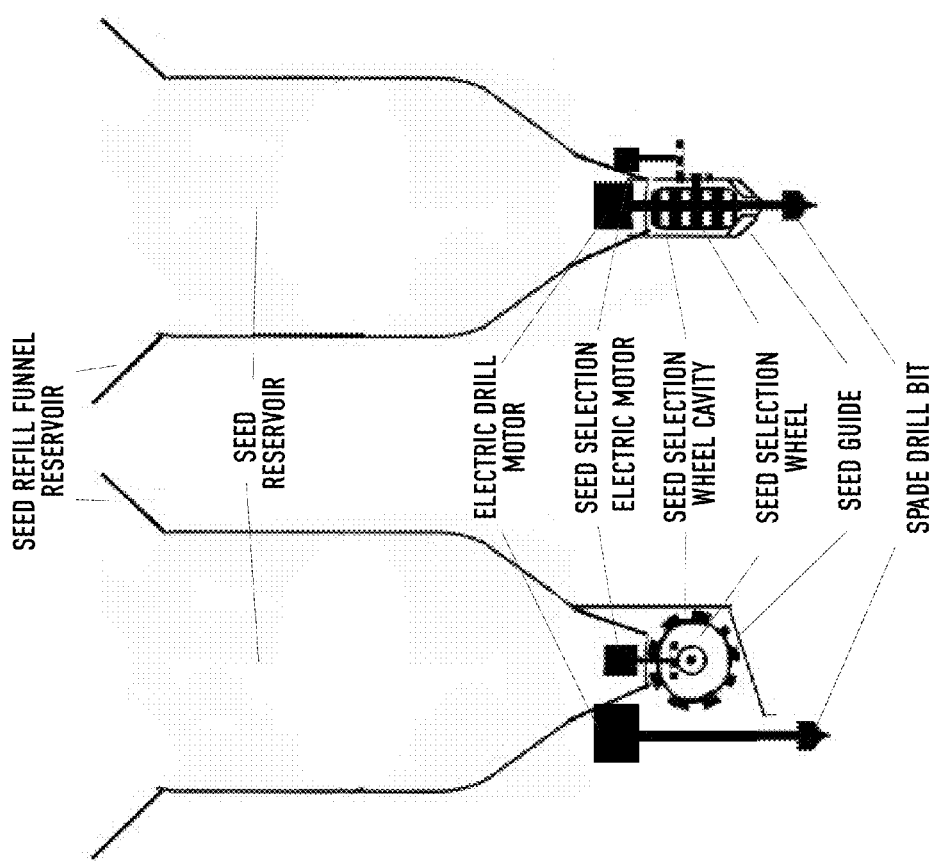
FIG. 7 shows an example of a planting toolset.
Figure 8:
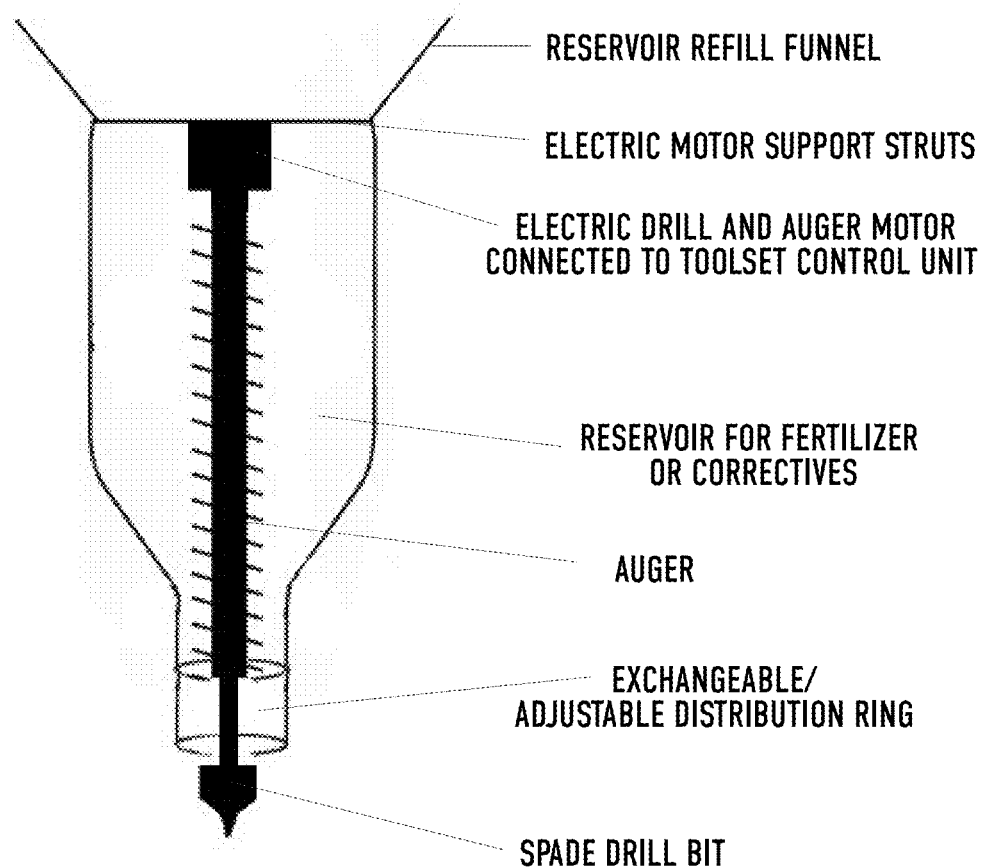
FIG. 8 shows an example of a drill fertilizing toolset.
Figure 9:
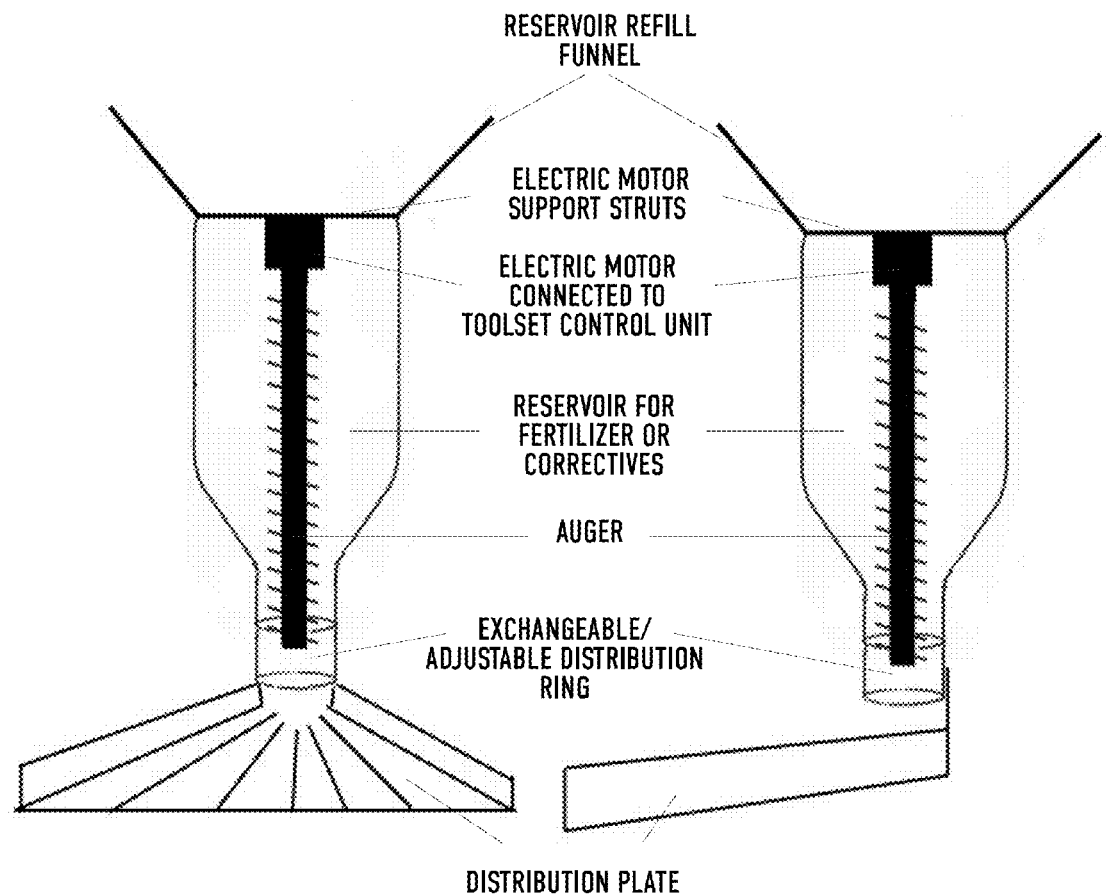
FIG. 9 shows an example of a broadcast fertilizing toolset.
Figure 10:
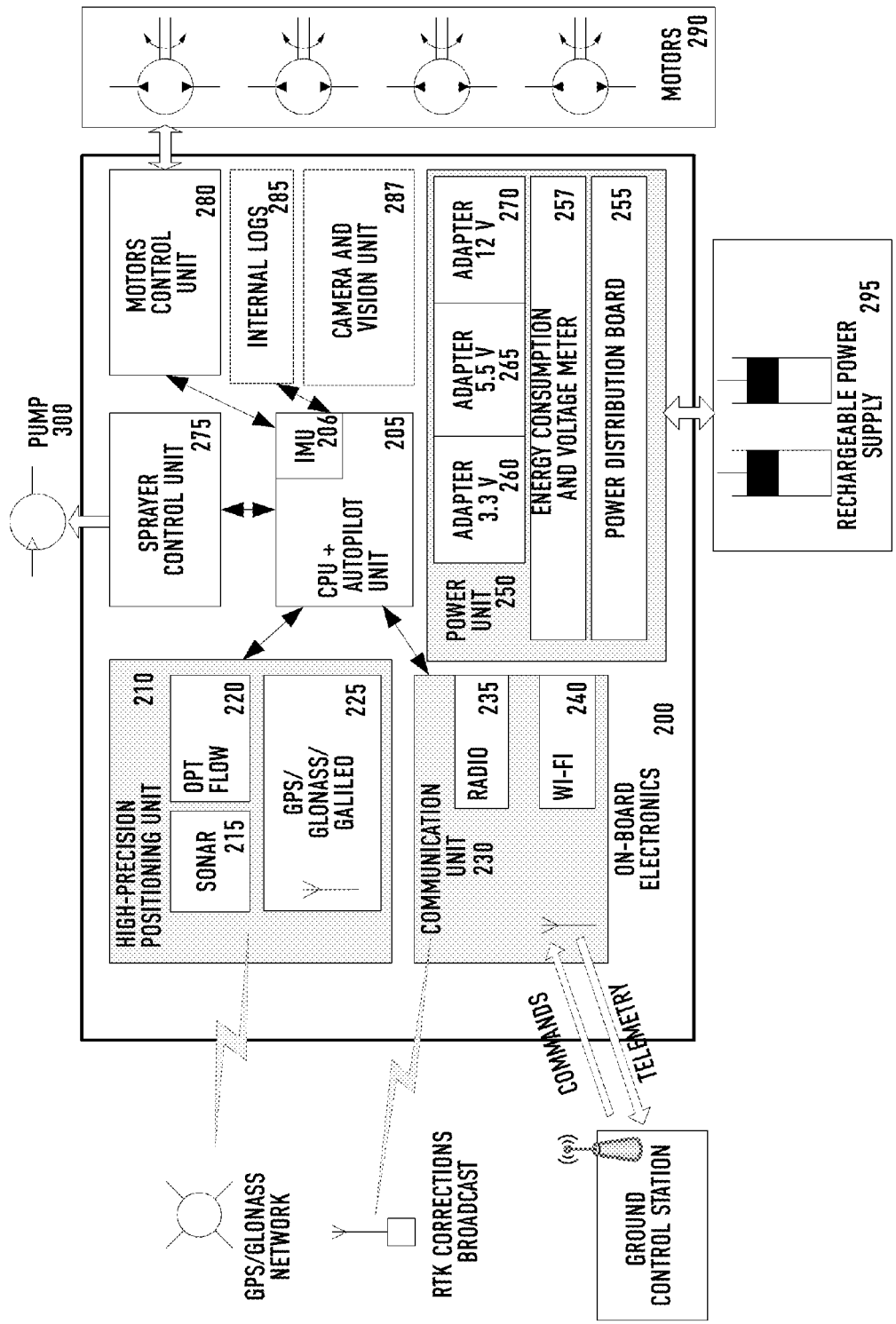
FIG. 10 shows the on-board electronics for an aerial farm robot.
Figure 11:
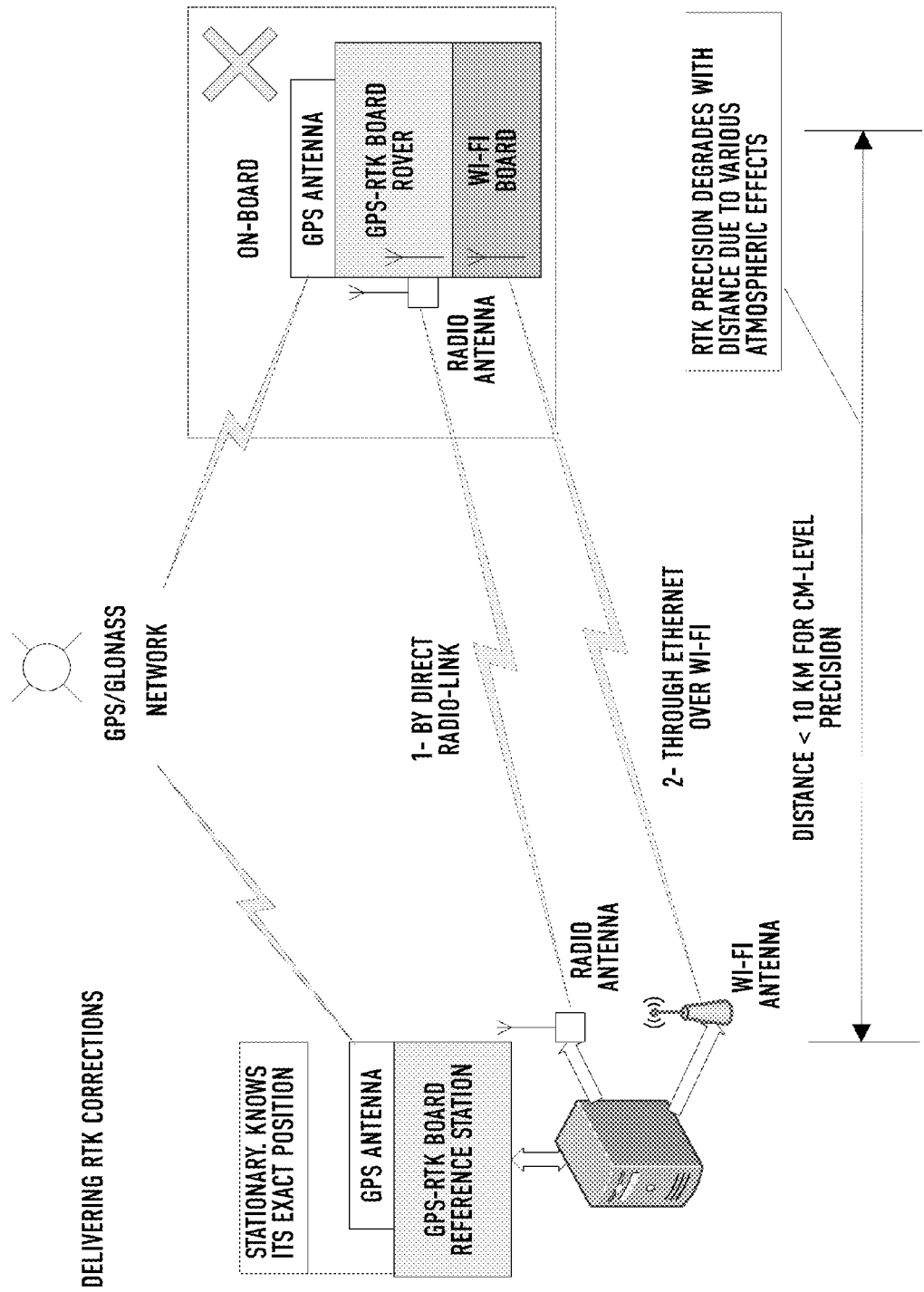
FIG. 11 shows how RTK corrections to GPS position location are made using Wi-Fi.
Figure 12:
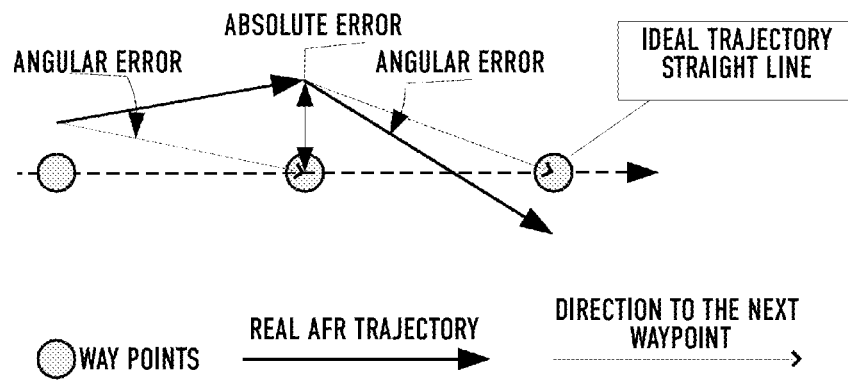
FIG. 12 shows how to reduce errors by tuning the direction to a waypoint.
Figure 13:
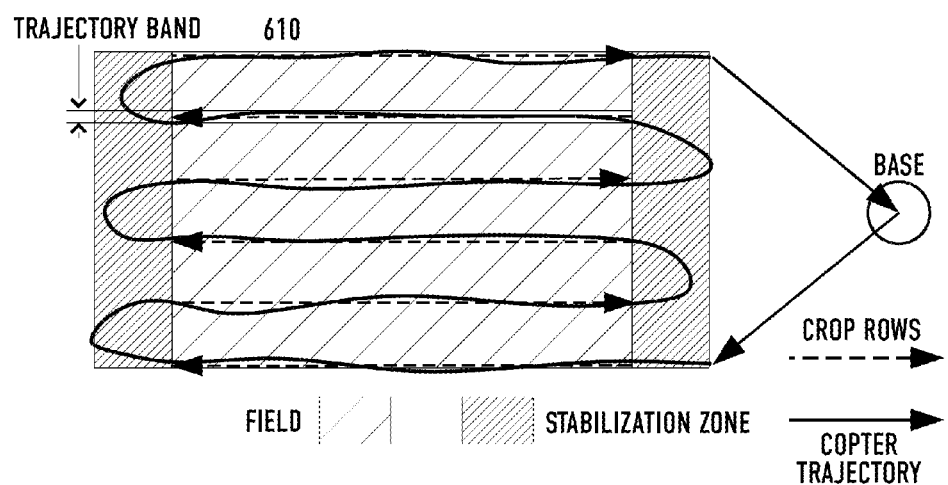
FIG. 13 shows how to use stabilization zones to increase precision of aerial farm robot operation.
Figure 14:
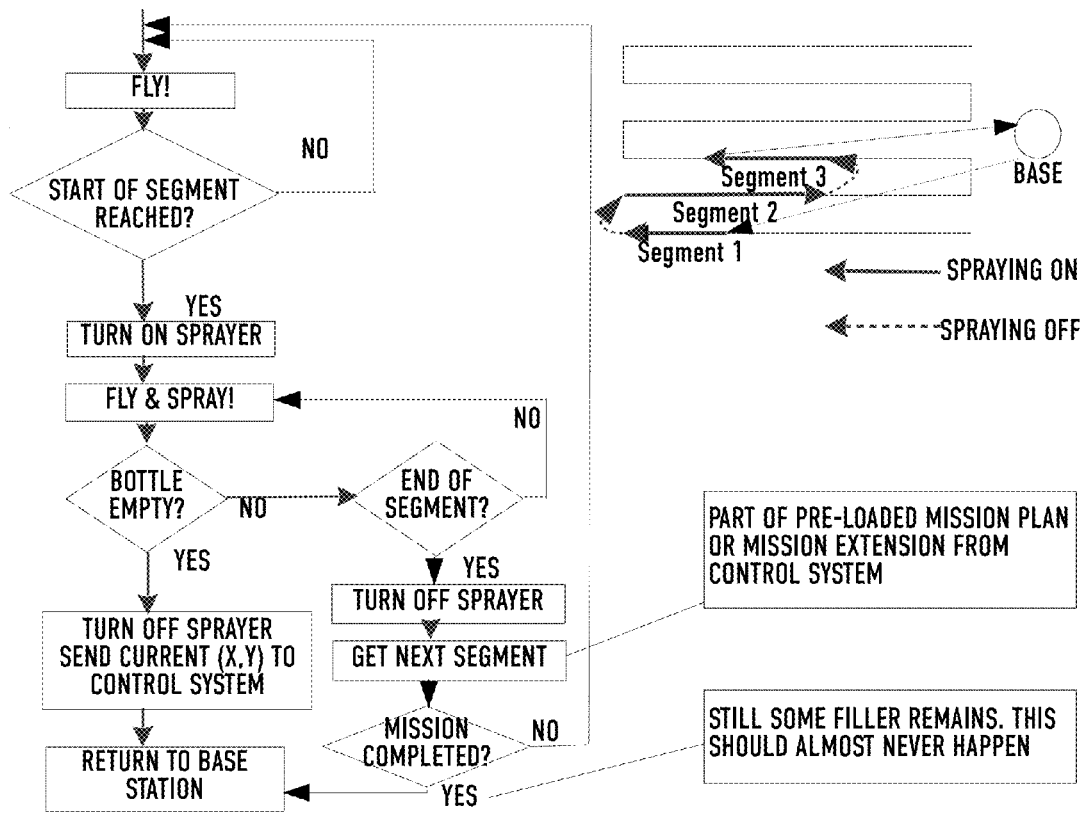
FIG. 14 shows a sample of the logic for executing a mission plan.
Figure 15:
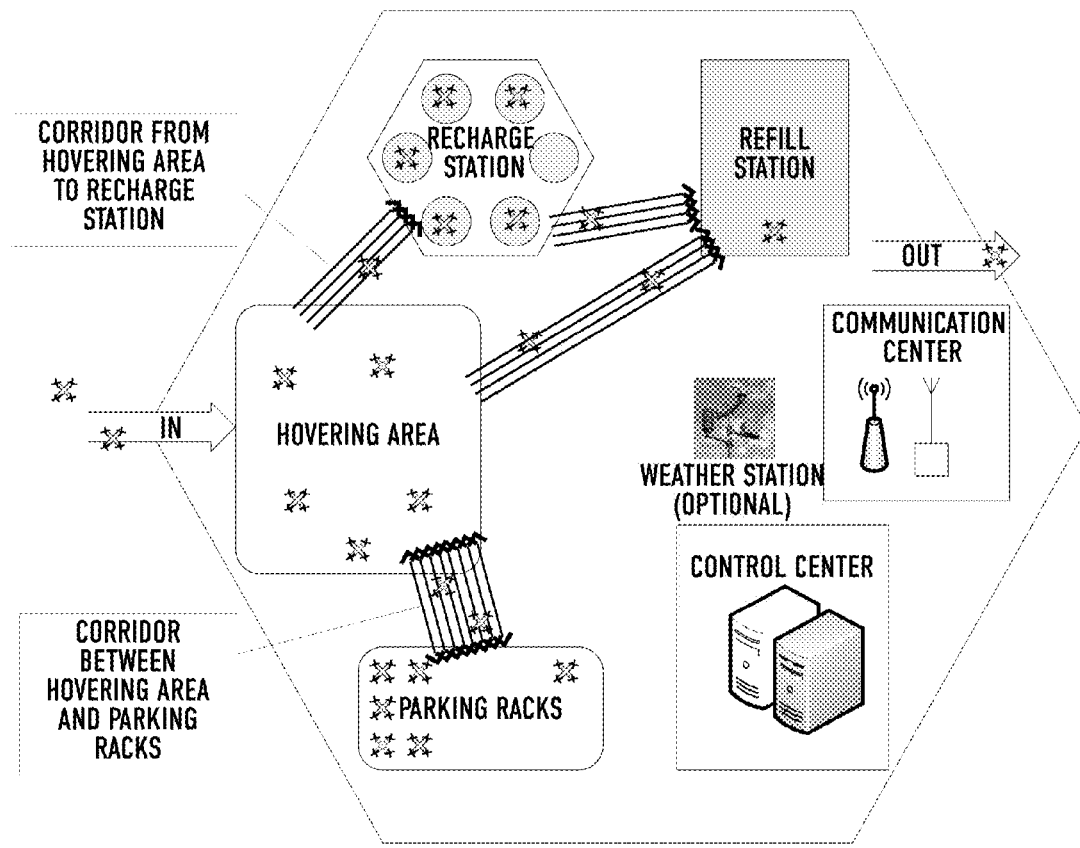
FIG. 15 shows the components of a base station.
Figure 16:
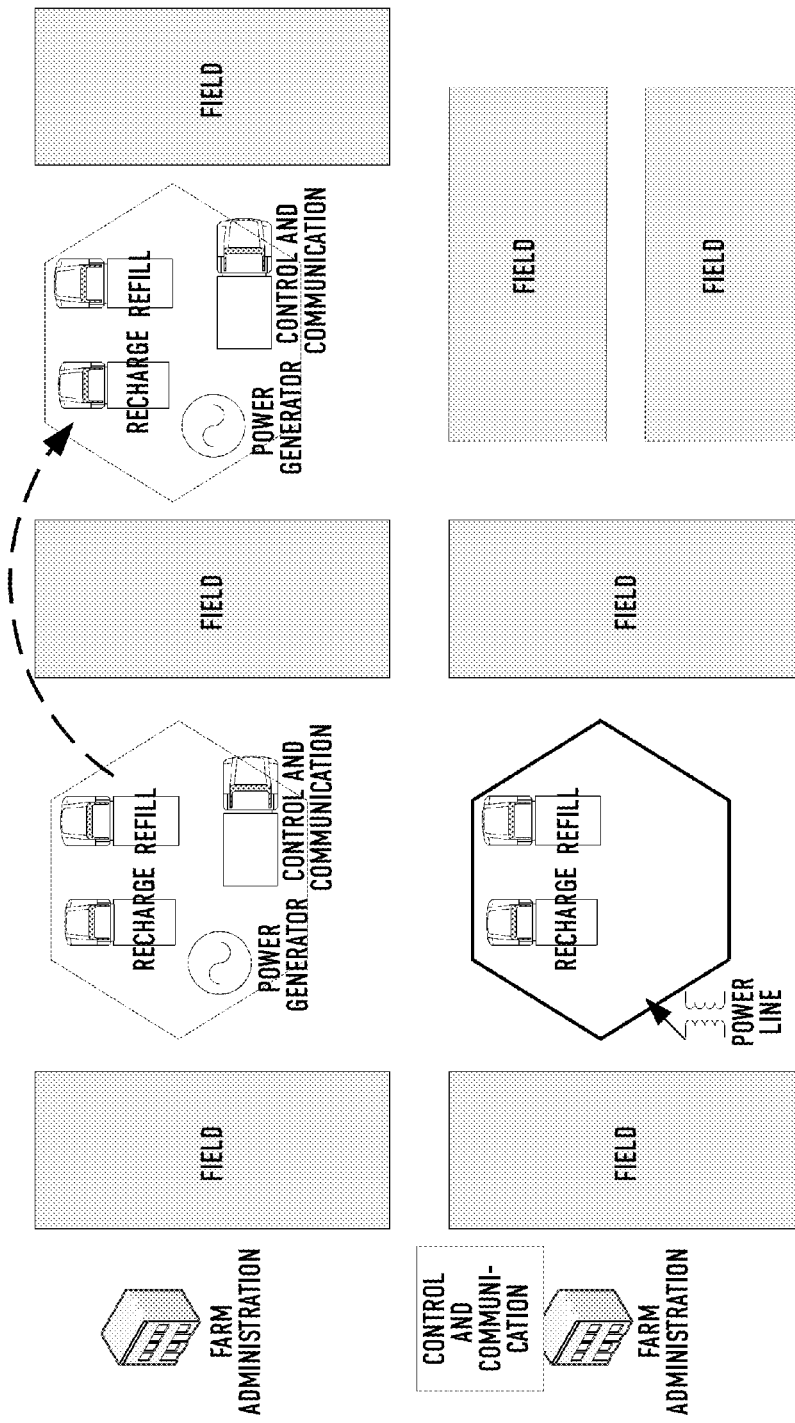
FIG. 16 shows two possible configurations of a base station and a communication center.
Figure 17:
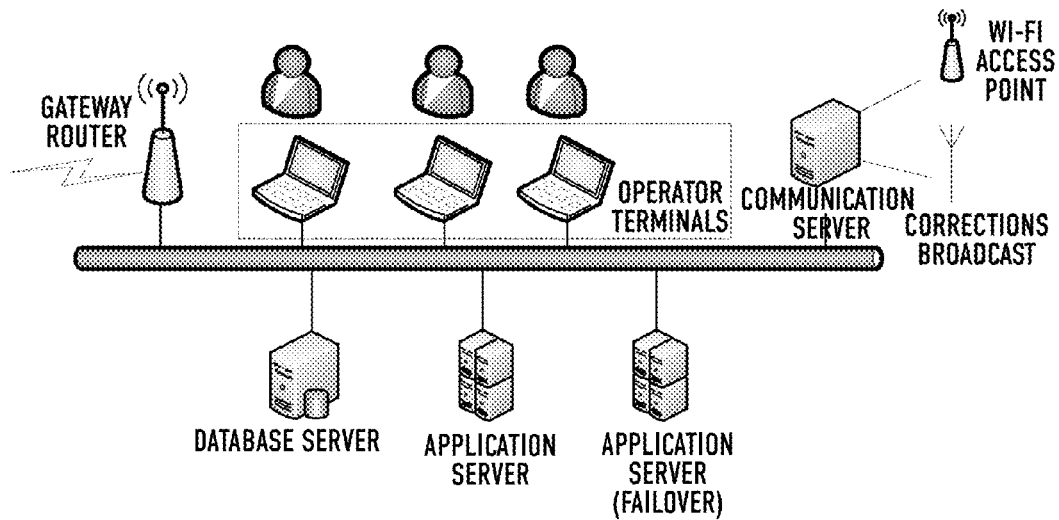
FIG. 17 shows the components of a control center.
Figure 18:
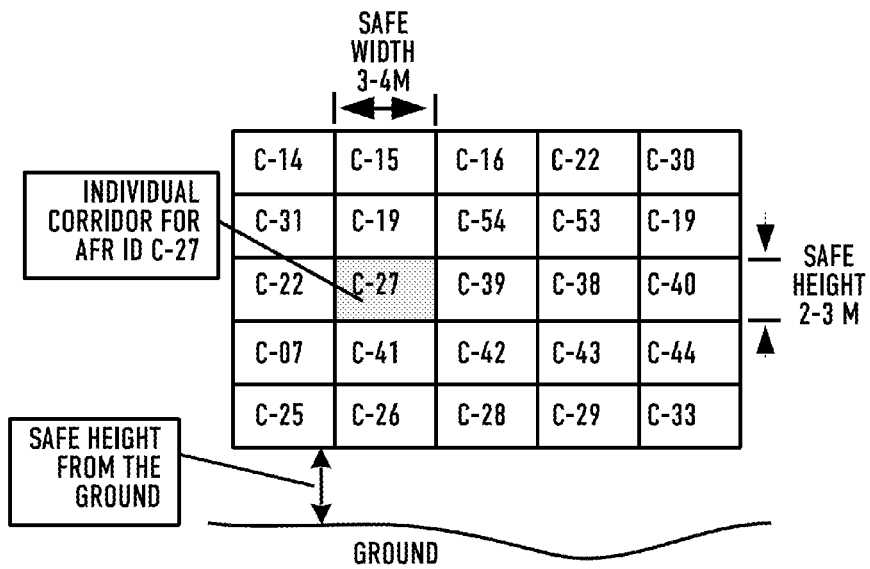
FIG. 18 shows pre-defined corridors for flight to avoid collisions, shown sliced both horizontally and vertically.
Figure 19:
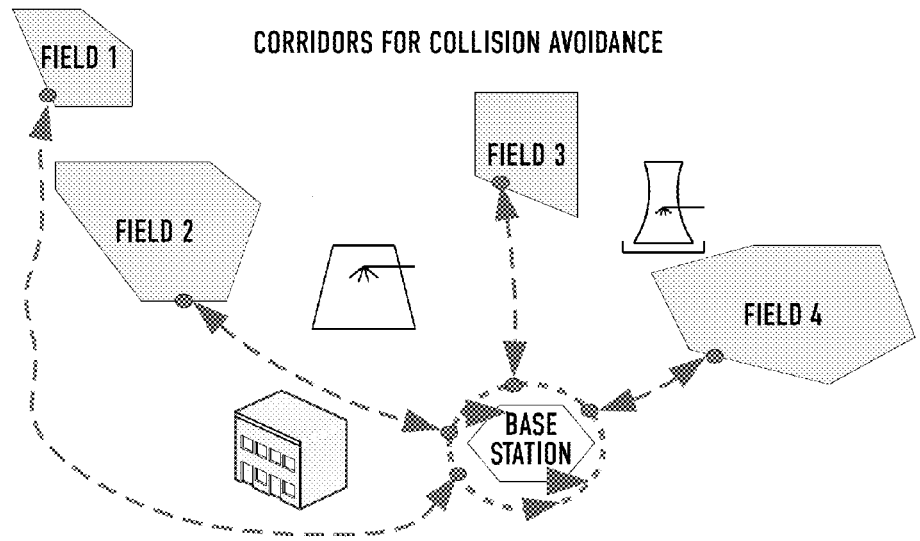
FIG. 19 shows an example of flight corridors between a base station and fields for collision avoidance.
Figure 20:
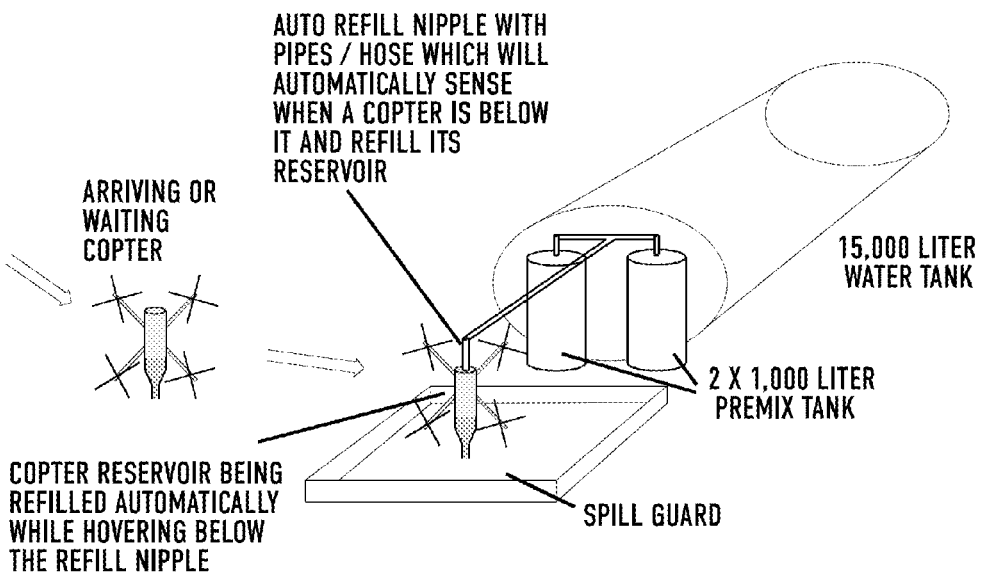
FIG. 20 shows how the reservoir of an aerial farm robot can be refilled for crop dusting or applying liquid fertilizer.
Figure 21:
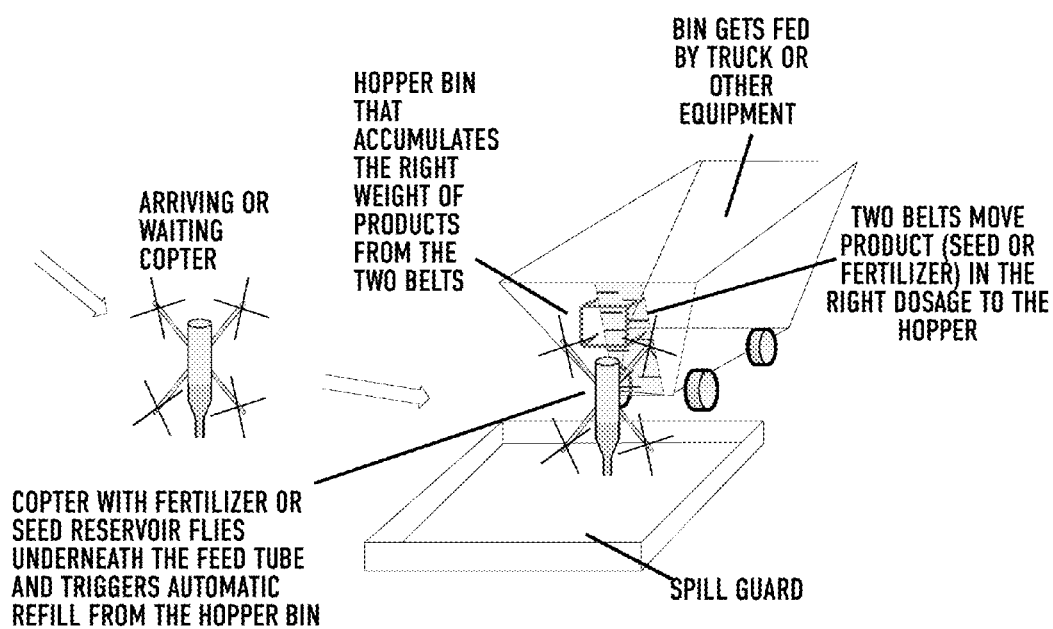
FIG. 21 shows how the reservoir of an aerial farm robot can be refilled for planting or fertilizing with granular fertilizer.
Figure 22:
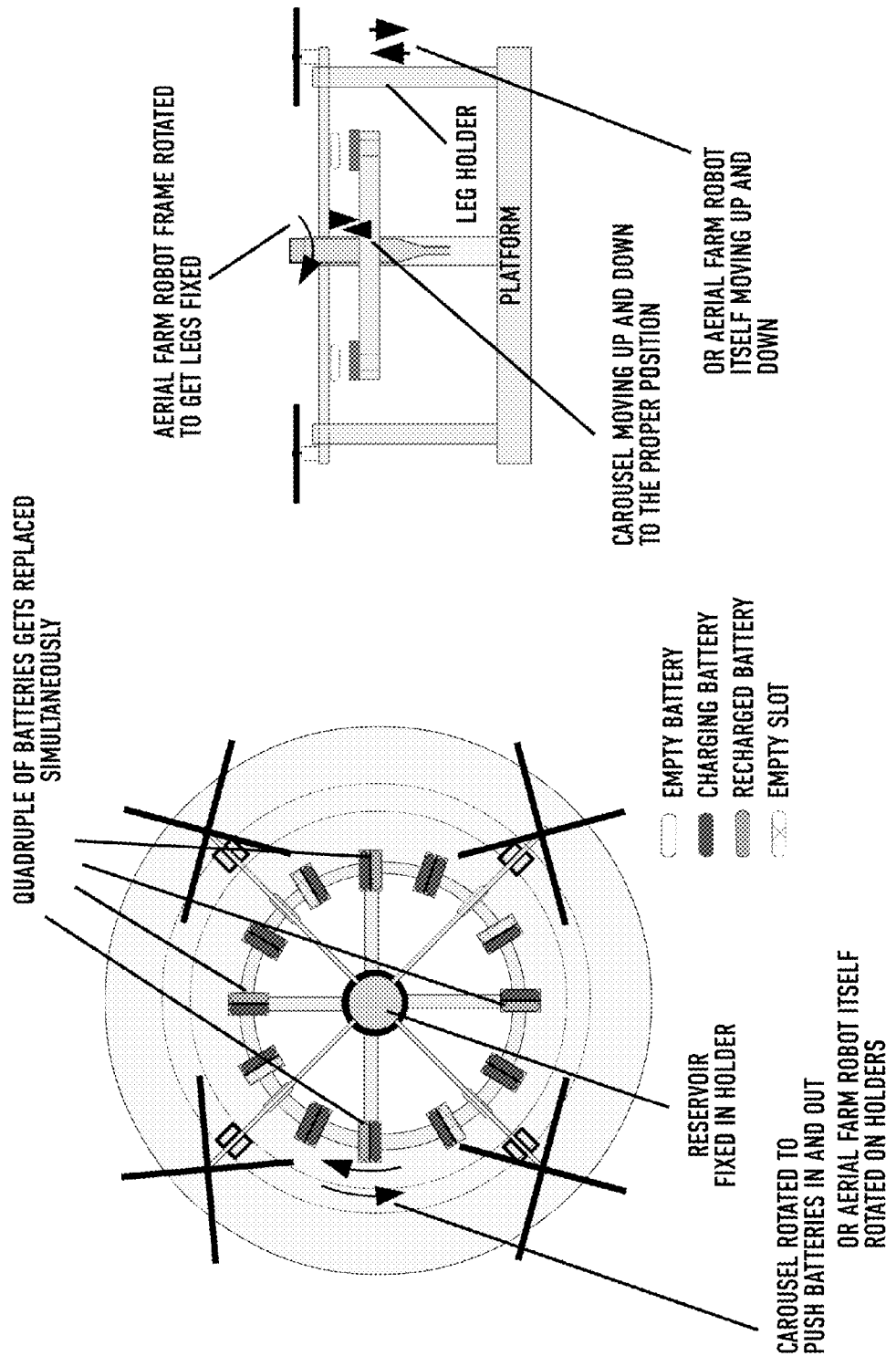
FIG. 22 shows an automatic carousel for a battery changer/recharger and an aerial farm robot being positioned to refill it.
Figure 23:
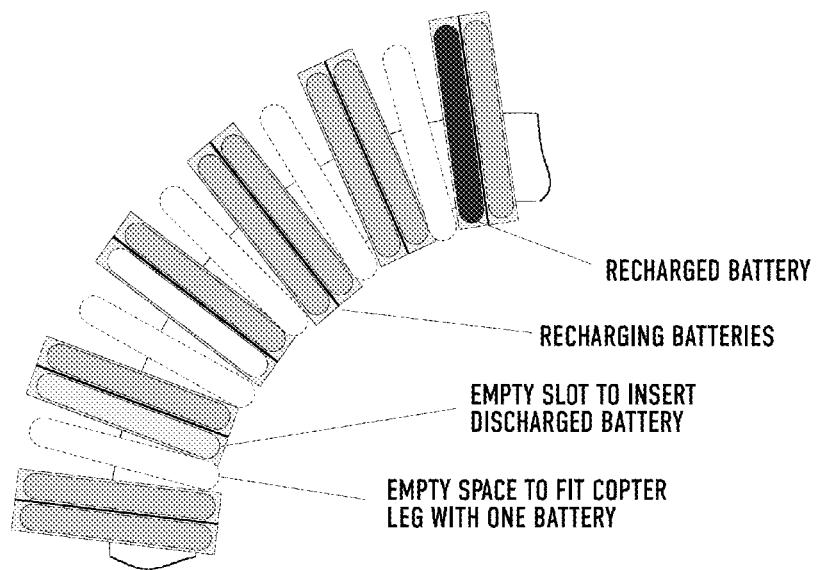
FIG. 23 shows how batteries are positioned in a carousel.
Figure 24:
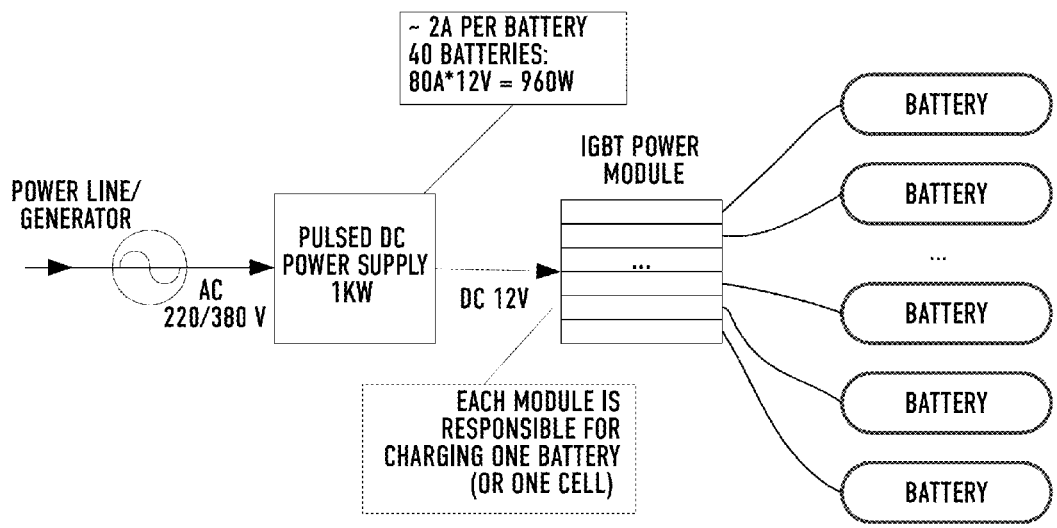
FIG. 24 shows the power supply for recharging batteries.
Figure 25:
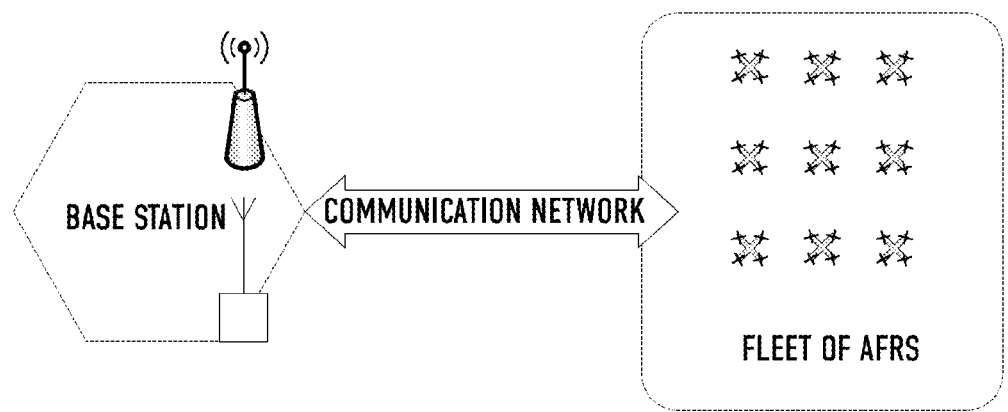
FIG. 25 shows how a communication network connects a base station with a fleet of aerial farm robots.
Figure 26:
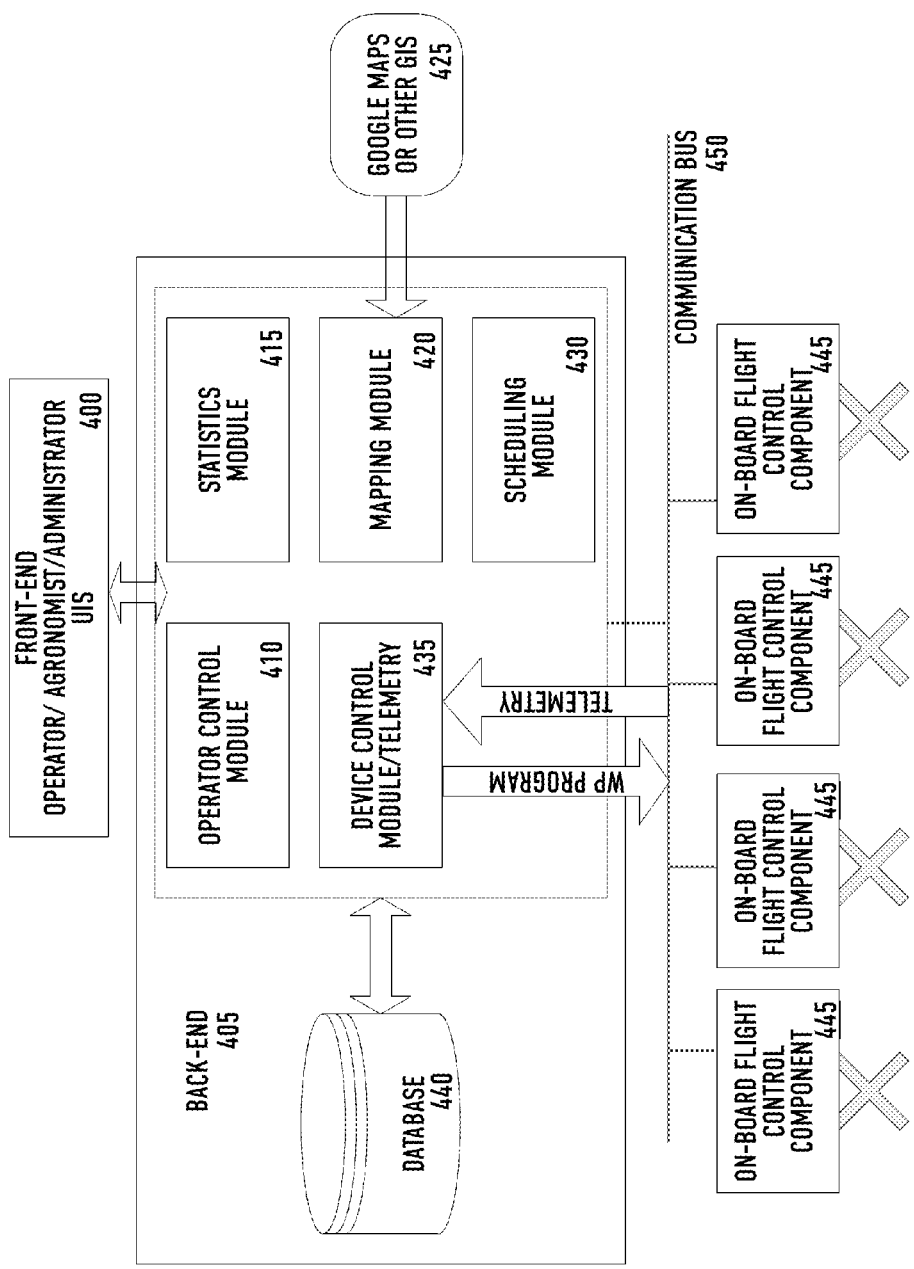
FIG. 26 shows the components of the farm control system backend.
Figure 30:
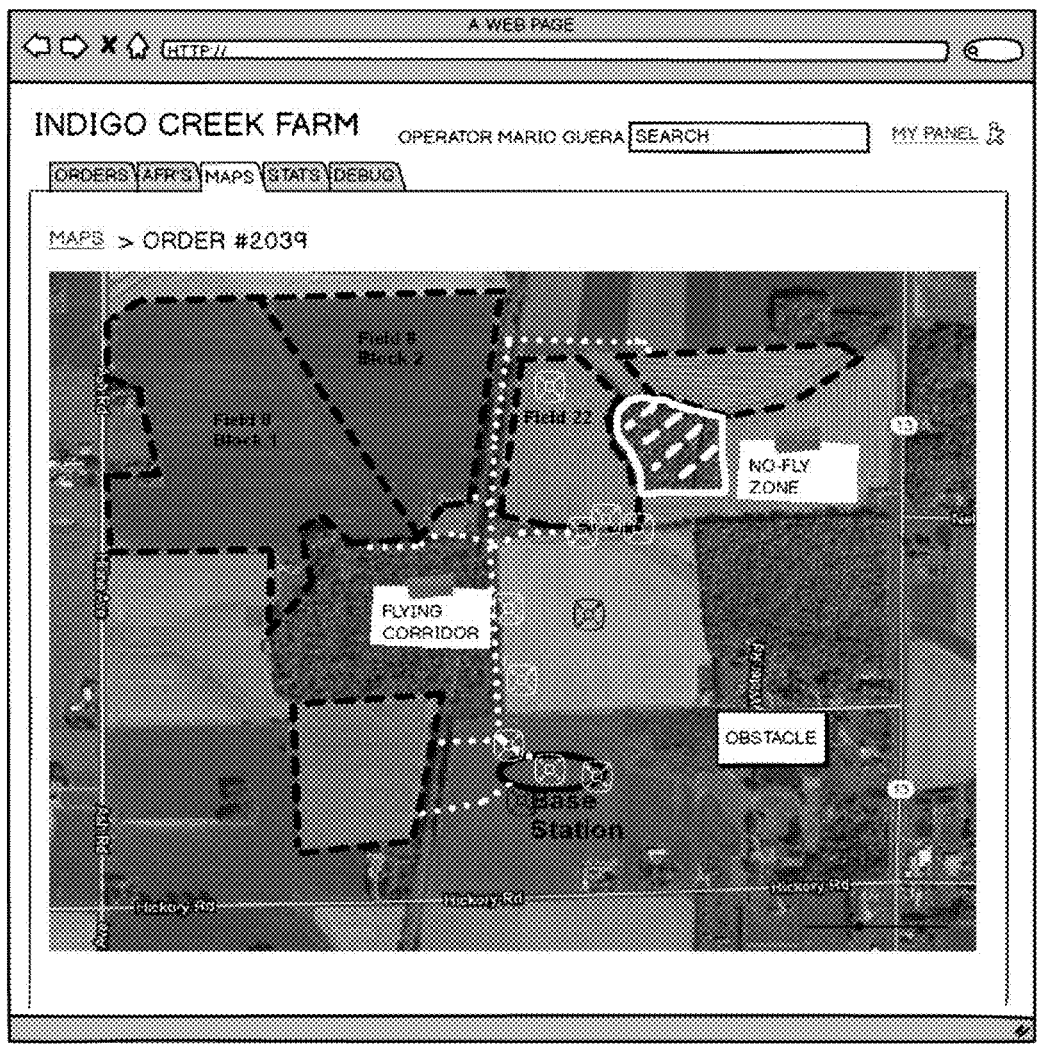
FIG. 30 shows all of the service order areas displayed as an overlay on a map of the farm.
Figure 31:
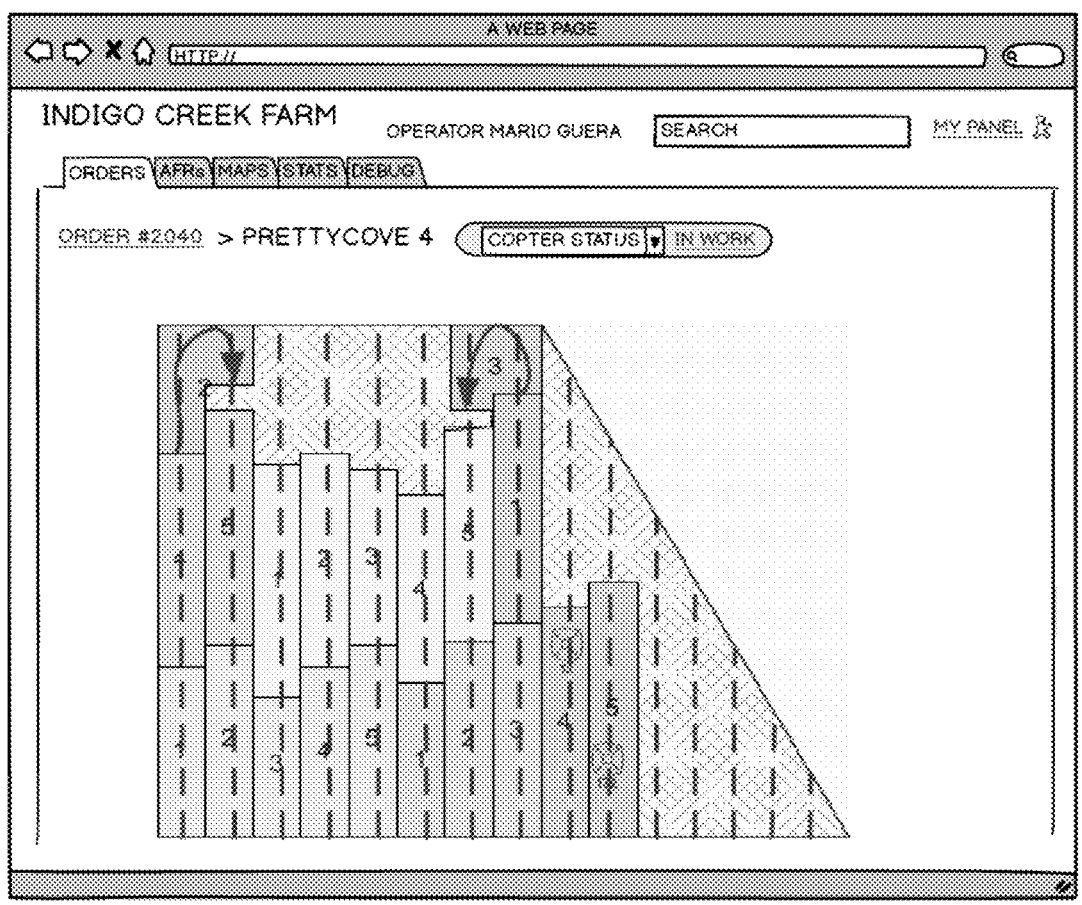
FIG. 31 shows a map of the service order for a particular field or block.
Figure 32:
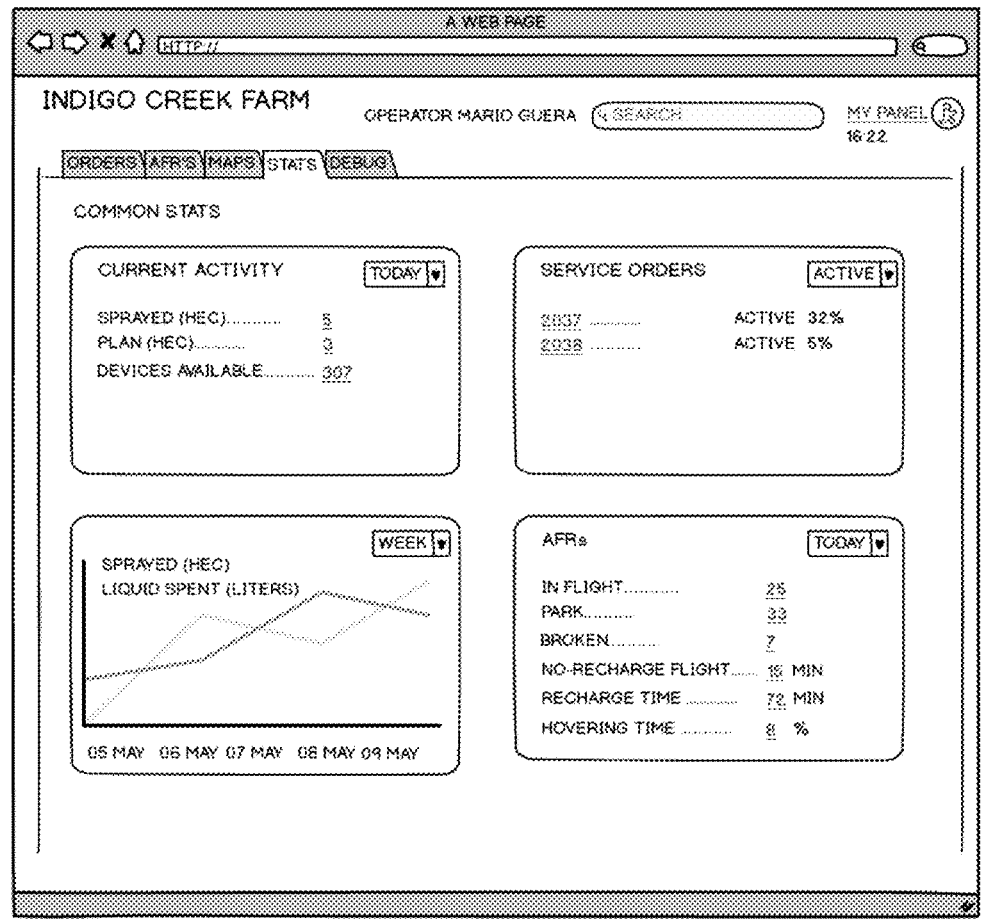
FIG. 32 shows an overview of farm operation statistics.
Figure 33:
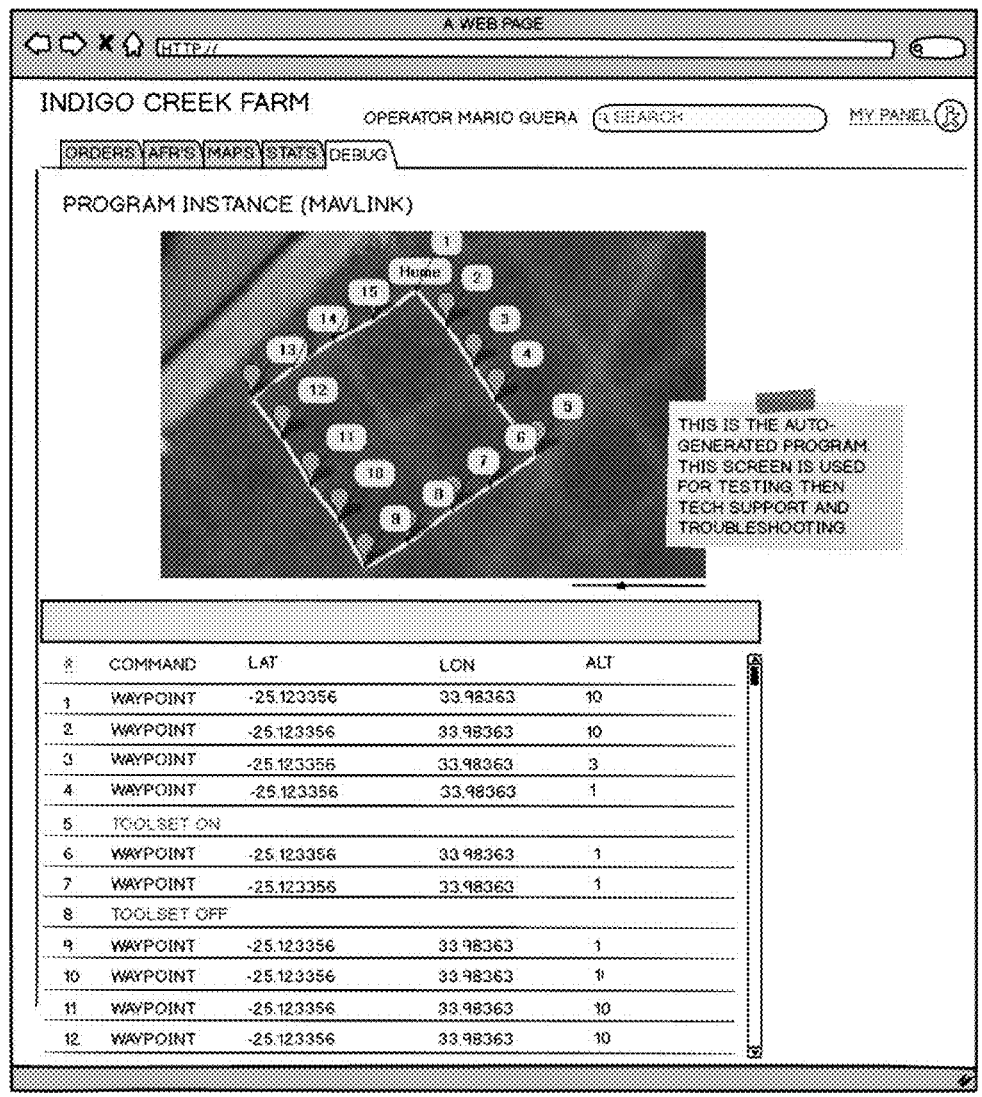
FIG. 33 shows a screen that helps in testing, tech support, and troubleshooting of a mission program.
Figure 34:
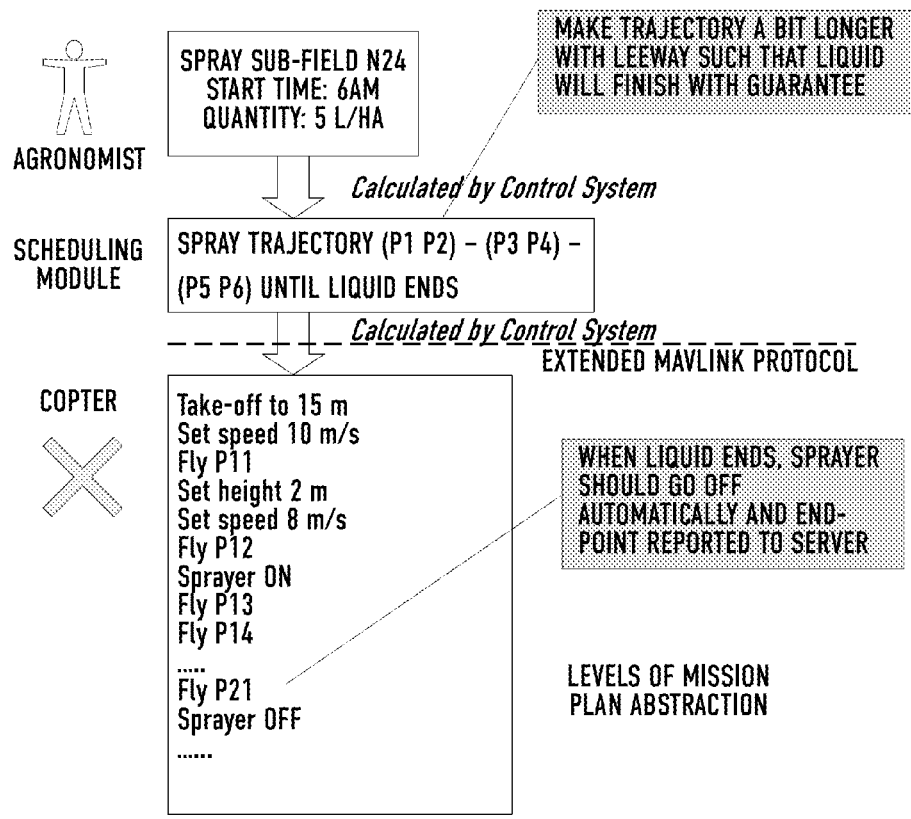
FIG. 34 shows the translation of a service order to a waypoint program.
Figure 35:
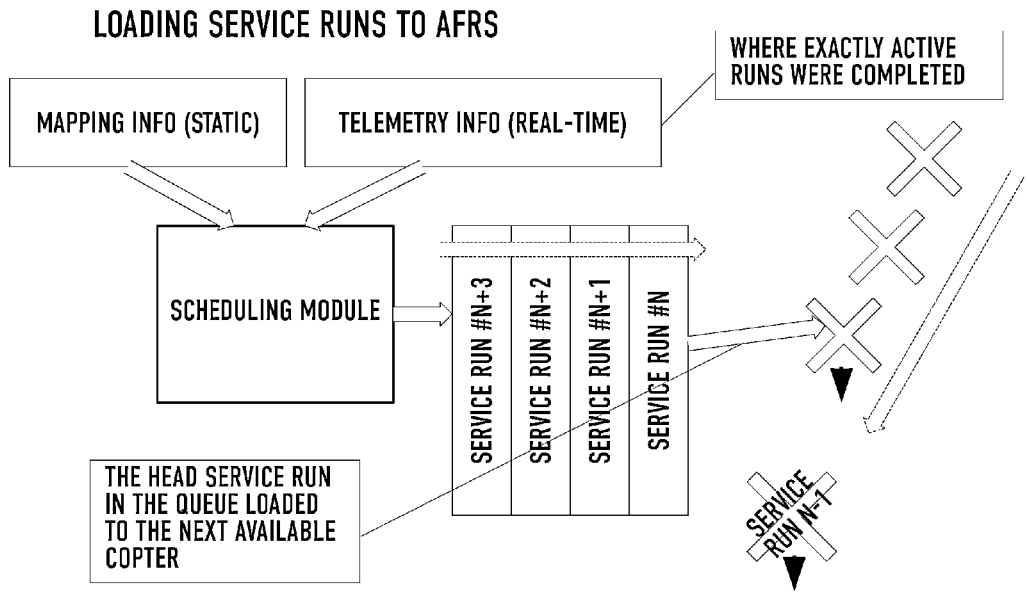
FIG. 35 shows how a service order is generated and loaded to aerial farm robots.
Figure 36:
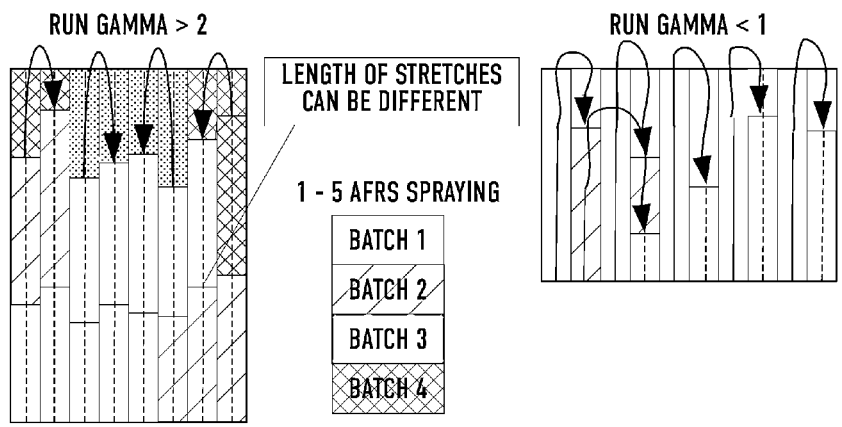
FIG. 36 shows a comparison of the difference in Run-Gamma between two different service orders.
Figure 37:
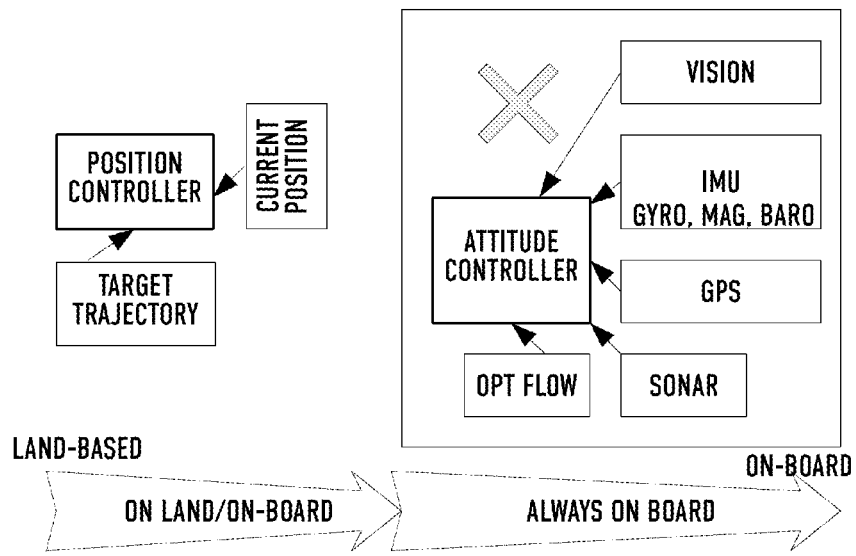
FIG. 37 shows a block diagram showing precise positioning alternative—onboard.
Figure 38:
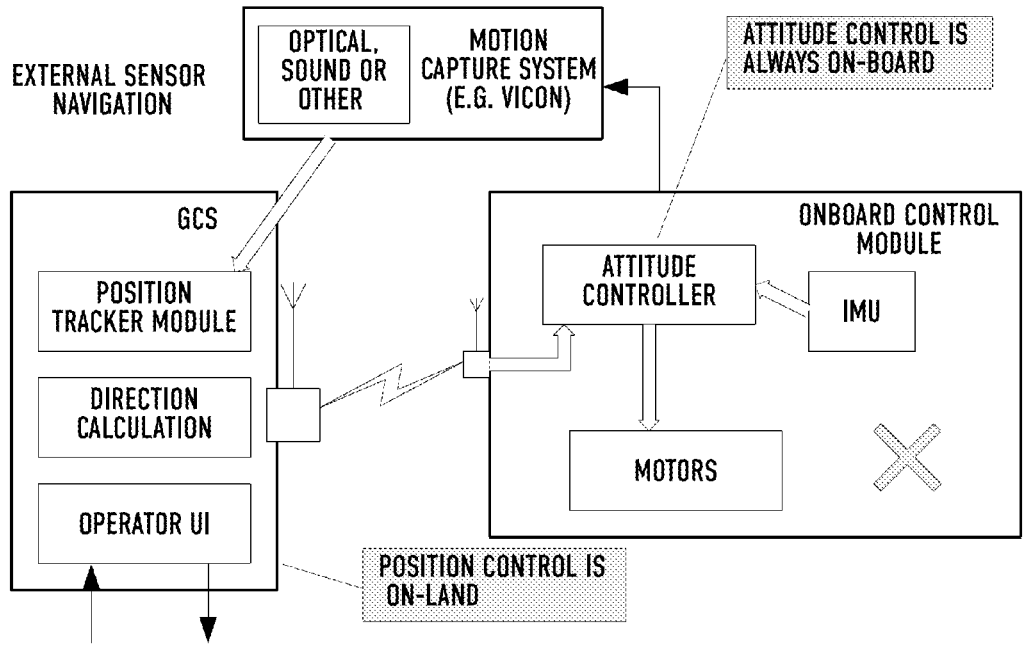
FIG. 38 shows a block diagram showing precise positioning alternative—external.

We claim:

1. A method of automated farming where a fleet of two or more aerial farm robots is used to carry out farming tasks and where the method includes at least the operations of:

accepting from a farmer a service order to carry out a farming task on a field or on plants being farmed, creating and maintaining a map of the field and plants being farmed, using the map to transform the service order into individual assignments for each of the aerial farm robots in the fleet to perform on all or part of the field or for one or more of the plants being farmed, using a reservoir on at least one aerial farm robot in the fleet to hold farm inputs, monitoring the amount of the farm inputs remaining in the reservoir and automatically refilling the reservoir on the at least one aerial farm robot when the reservoir becomes empty, tracking the precise coordinates of each robot at all times;

using the precise coordinates to automatically plot individual assignments for the two or more robots and then simultaneously directing the two or more robots to proceed along individual paths to individual points in the field and to perform a farming task beginning at those points, using a toolset on at least one aerial farm robot in the fleet to deliver the farm inputs or to perform other farming tasks, monitoring the amount of power remaining on each of the aerial farm robots in the fleet and automatically providing additional power to each robot when power becomes too low, controlling traffic as the aerial farm robots in the fleet travel so the robots avoid colliding with each other or with people or other things, and directing the aerial farm robots in the fleet to a home base for automatic parking or storage when no longer needed.

2. An automated farming system that includes at least the following:

a fleet of two or more aerial farm robots which are configured to allow refillable reservoirs or toolsets, or both refillable reservoirs and toolsets, to be used, a program which creates and maintains a map of the field and plants being farmed and which allows a farmer to input a service order to perform a farming task, and then using the map transforms that service order into directions for each individual robots in the fleet of robots, a home base for parking or storing the robots in the fleet when they are not operating, a high-precision positioning unit responsible for tracking the precise coordinates of each robot at all times;

a control system for simultaneously controlling the two or more robots in the fleet, which control system uses the precise coordinates tracked by the high-precision positioning unit to automatically plot an assignment for each robot and then directs the robot to proceed along a path to a point in the field and to perform a farming task beginning at that point, equipment for refilling the robots in the fleet with farm inputs, equipment for automatically recharging the robots with power, and equipment for communicating with the robots.

3. A system for farming that includes at least the following:

a fleet of two or more flying robots capable of moving autonomously or semi-autonomously above a field and plants being farmed and capable of carrying refillable reservoirs or toolsets, or both refillable reservoirs and toolsets, for delivering farm inputs, a control subsystem capable of receiving directions from an operator to carry out farming tasks and capable of simultaneously controlling the two or more robots to carry out the farming tasks by creating and maintaining a map of the field and plants being farmed, tracking the precise coordinates of each robot at all times, using the map and the precise coordinates to automatically plot an assignment for the robot, and then directing the robot to proceed along a path to a point in the field and to perform a farming task beginning at that point, and a power subsystem capable of automatically providing power to the fleet of robots so that they can move and carry out the farming functions.

* * * * *